United States Patent
Charlesworth et al.

(10) Patent No.: US 7,337,116 B2
(45) Date of Patent: Feb. 26, 2008

(54) SPEECH PROCESSING SYSTEM

(75) Inventors: Jason Peter Andrew Charlesworth, Surrey (GB); Jebu Jacob Rajan, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 655 days.

(21) Appl. No.: 09/985,543

(22) Filed: Nov. 5, 2001

(65) Prior Publication Data

US 2002/0120447 A1 Aug. 29, 2002

(30) Foreign Application Priority Data

Nov. 7, 2000 (GB) .................................. 0027178.3

(51) Int. Cl.
G10L 15/00 (2006.01)
G10L 15/06 (2006.01)

(52) U.S. Cl. .................. 704/254; 704/256; 704/251; 704/244

(58) Field of Classification Search .............. 704/254, 704/256, 251, 244; 434/169
See application file for complete search history.

(56) References Cited

U.S. PATENT DOCUMENTS

| | | | |
|---|---|---|---|
| 4,227,176 A | 10/1980 | Moshier | 340/146.3 R |
| 4,736,429 A | 4/1988 | Niyada et al. | 381/43 |
| 4,903,305 A * | 2/1990 | Gillick et al. | 704/240 |
| 4,975,959 A * | 12/1990 | Benbassat | 704/240 |
| 4,980,918 A | 12/1990 | Bahl et al. | 381/43 |
| 4,985,924 A | 1/1991 | Matsuura | 381/43 |
| 5,075,896 A | 12/1991 | Wilcox et al. | 382/39 |
| 5,131,043 A * | 7/1992 | Fujii et al. | 704/236 |
| 5,136,655 A | 8/1992 | Bronson | 381/41 |
| 5,202,952 A | 4/1993 | Gillick et al. | 395/2 |
| 5,333,275 A | 7/1994 | Wheatley et al. | 395/2.52 |
| 5,390,278 A | 2/1995 | Gupta et al. | 395/2.52 |
| 5,500,920 A | 3/1996 | Kupiec | 395/2.79 |
| 5,577,249 A | 11/1996 | Califano | 395/611 |
| 5,594,641 A | 1/1997 | Kaplan et al. | 395/601 |
| 5,638,425 A | 6/1997 | Meador et al. | 379/88 |
| 5,640,487 A | 6/1997 | Lau et al. | 395/2.52 |
| 5,649,060 A | 7/1997 | Ellozy et al. | 395/2.87 |

(Continued)

FOREIGN PATENT DOCUMENTS

EP 0 597 798 A1 5/1994

(Continued)

OTHER PUBLICATIONS

Bahl et al., "A metod for the construction of acoustic Markov models for words," Oct. 1993, IEEE Transactions on Speech and Audio Processing, vol. 1, Issue 4, pp. 443-452.*
Haeb-Umbach et al., "Automatic transcription of unknown words in a speech recognition system," May 1995, International Conference on Acoustics, Speech, and Signal Processing, vol. 1, pp. 840-843.*
Markowitz, "Using Speech Recognition," Prentice Hall, 1996, p. 221.*

(Continued)

Primary Examiner—V. Paul Harper
(74) Attorney, Agent, or Firm—Fitzpatrick, Cella, Harper & Scinto

(57) ABSTRACT

A system is provided for allowing a user to add word models to a speech recognition system. In particular, the system allows a user to input a number of renditions of the new word and which generates from these a sequence of phonemes representative of the new word. This representative sequence of phonemes is stored in a word to phoneme dictionary together with the typed version of the word for subsequent use by the speech recognition system.

78 Claims, 18 Drawing Sheets

U.S. PATENT DOCUMENTS

| | | | |
|---|---|---|---|
| 5,675,706 A | 10/1997 | Lee et al. | 395/2.65 |
| 5,680,605 A | 10/1997 | Torres | 395/603 |
| 5,684,925 A | 11/1997 | Morin et al. | 395/2.63 |
| 5,708,759 A | 1/1998 | Kemeny | 395/2.63 |
| 5,721,939 A | 2/1998 | Kaplan | 395/759 |
| 5,729,741 A | 3/1998 | Liaguno et al. | 395/615 |
| 5,737,489 A | 4/1998 | Chou et al. | 395/2.65 |
| 5,737,723 A | 4/1998 | Riley et al. | 704/243 |
| 5,752,227 A * | 5/1998 | Lyberg | 704/231 |
| 5,781,884 A | 7/1998 | Pereira et al. | 704/260 |
| 5,787,414 A | 7/1998 | Miike et al. | 707/2 |
| 5,799,267 A | 8/1998 | Siegel | 704/1 |
| 5,835,667 A | 11/1998 | Wactlar et al. | 386/96 |
| 5,852,822 A | 12/1998 | Srinivasan et al. | 704/4 |
| 5,870,740 A | 2/1999 | Rose et al. | 707/5 |
| 5,873,061 A * | 2/1999 | Hab-Umbach et al. | 704/251 |
| 5,907,821 A | 5/1999 | Kaji et al. | 704/4 |
| 5,983,177 A * | 11/1999 | Wu et al. | 704/243 |
| 5,999,902 A | 12/1999 | Scahill et al. | 704/240 |
| 6,023,536 A | 2/2000 | Visser | 382/310 |
| 6,026,398 A | 2/2000 | Brown et al. | 707/5 |
| 6,061,679 A | 5/2000 | Bournas et al. | 707/3 |
| 6,172,675 B1 | 1/2001 | Ahmad et al. | 345/328 |
| 6,182,039 B1 * | 1/2001 | Rigazio et al. | 704/239 |
| 6,192,337 B1 | 2/2001 | Ittycheriah et al. | 704/231 |
| 6,236,964 B1 | 5/2001 | Tamura et al. | 704/254 |
| 6,243,680 B1 * | 6/2001 | Gupta et al. | 704/258 |
| 6,272,242 B1 | 8/2001 | Saitoh et al. | 382/187 |
| 6,314,400 B1 | 11/2001 | Klakow | 704/257 |
| 6,321,226 B1 | 11/2001 | Garber et al. | 707/10 |
| 6,389,395 B1 * | 5/2002 | Ringland | 704/242 |
| 6,487,532 B1 | 11/2002 | Schoofs et al. | 704/251 |
| 6,490,563 B2 | 12/2002 | Hon et al. | 704/260 |
| 6,535,850 B1 | 3/2003 | Bayya | 704/239 |
| 6,567,778 B1 | 5/2003 | Chao Chang et al. | 704/257 |
| 6,567,816 B1 | 5/2003 | Desai et al. | 707/102 |
| 6,662,180 B1 | 12/2003 | Aref et al. | 707/6 |

FOREIGN PATENT DOCUMENTS

| | | |
|---|---|---|
| EP | 0 649 144 A1 | 4/1995 |
| EP | 0 689 153 A2 | 12/1995 |
| EP | 0 789 349 A2 | 8/1997 |
| EP | 0 849 723 A2 | 6/1998 |
| GB | 2 302 199 A | 1/1997 |
| GB | 2 331 816 A | 6/1999 |
| GB | 2 349 260 A | 10/2000 |
| WO | WO 98/47084 | 10/1998 |
| WO | WO 99/05681 | 2/1999 |
| WO | WO 00/31723 | 6/2000 |
| WO | WO 00/54168 | 9/2000 |

OTHER PUBLICATIONS

Srinivasan et al., "Phonetic confusion matrix based spoken document retrieval," Proceedings of the 23rd annual international ACM SIGIR conference on Research and development in information retrieval, Jul. 24-28, 2000, pp. 81-87.*

D.A. James, et al., "A Fast Lattice-Based Approach To Vocabulary Independent Wordspotting", IEEE, vol. 1, pp. 377-380 (1994).

Phillipe Gelin, et al., "Keyword Spotting for Video Soundtrack Indexing", IEEE, vol. 1, p. 299-302 (1996).

C. Berge, "Graphs and Hypergraphs", North Holland Mathematical Library, Amsterdam XP002192893, p. 175 (1976).

Schmid, et al., "Automatically Generated Word Pronunciations from Phoneme Classifier Output", IEEE, pp. 223-226 (1993).

"Template Averaging for Adapting a Dynamic Time Warping Speech Recognizer", IBM Technical Disclosure Bulletin, vol. 32, No. 11, pp. 422-426 (Apr. 1990).

Micca, et al., "Three Dimensional DP for Phonetic Lattice Matching", Digital Signal Processing, pp. 547-551 (1987).

Lee, Kai-Fu, "Automatic Speech Recognition: The Development of the Sphinx System", Carnegie Mellon University, pp. 28-29 (1989).

Wold, et al., "Content-Based Classification, Search, and Retrieval of Audio", IEEE Multimedia, vol. 3, No. 3, pp. 27-36 (Fall 1996).

Wright, et al., "Statistical Models for Topic Identification Using Phoneme Substrings", IEEE, pp. 307-310 (1996).

Ng, Kenney, "Survey of Approaches to Information Retrieval of Speech Messages", Spoken Language Systems Group Laboratory for Computer Science, Massachusetts Institute of Technology, pp. 1-34 (Feb. 16, 1996).

Foote, et al., "Unconstrained Keyword Spotting Using Phone Lattices with Application to Spoken Document Retrieval", Computer Speech and Language, vol. 11, pp. 207-224 (1997).

Ng, et al., "Subword Unit Representation for Spoken Document Retrieval", EUROSPEECH (1997).

Ng, et al., "Phonetic Recognition for Spoken Document Retrieval", Spoken Language Systems Group Laboratory for Computer Science, ICASSP (1998).

Jain, et al., "Creating Speaker-Specific Phonetic Templates With a Speaker-Independent Phonetic Recognizer: Implications for Voice Dialing", IEEE, pp. 881-884 (1996).

Zobel, et al., "Phonetic String Matching: Lesson from Information Retrieval", Sigir Forum,, Association for Computing Machinery, pp. 166-172 (1996).

Jokinen, et al., "A Comparison of Approximate String Matching Algorithms", Software-Practice and Experience, vol. 26(12), pp. 1439-1458 (Dec. 1996).

Besling, Stefan, "A Statistical Approach to Multilingual Phonetic Transcription", Philips Journal of Research, vol. 49, No. 4, pp. 367-379 (1995).

Gagnoulet, et al., "MAIRIEVOX: A Voice-Activated Information System", Speech Communication, vol. 10, No. 1, pp. 23-31 (Feb. 10, 1991).

Witbrock, et al., "Using Words and Phonetic Strings for Efficient Information Retrieval from Imperfectly Transcribed Spoken Documents", Proceedings of the 1997 2nd ACM International Conference on Digital Libraries, pp. 30-35 (Jul. 1997).

Cassidy, et al., "EMU: An Enhanced Hierarchical Speech Data Management System", Proceedings of the 6th Speech Science and Technology Conference, Adelaide, Australia, pp. 381-386 (1996).

Kobayashi, et al., "Matching Algorithms Between a Phonetic Lattice and Two Types of Templates—Lattice and Graph", IEEE, pp. 1597-1600 (1985).

Wechsler, Martin, "Spoken Document Retrieval Based on Phoneme Recognition", A Dissertation Submitted to the Swiss Federal Institute of Technology (ETH) Zurich, pp. 1-121 (1998).

Bird, et al., "Towards a Formal Framework for Linguistic Annotations", Linguistic Data Consortium, University of Pennsylvania (Dec. 1998).

Bird, et al., "A Formal Framework for Linguistic Annotation", pp. 1-37 (Aug. 13, 1999).

"Classic Maxim Entropy", John Skilling, Maximum Entropy and Bayesion Methods, 1989, pp. 45-52.

Sankoff, D. et al., "Timewarps, String Edits, and Macromolecules", CSLI Publications, pp. 1-44, 211-214, 311-321, and 359-362 (1999).

Rahim, M., "A Neural Tree Network for Phoneme Classification with Experiments on the TIMIT Database", IEEE, pp. 345-348 (1992).

Okawa, et al., "Automatic Training of Phoneme Dictionary Based on Mutual Information Criterion", IEEE, pp. 241-244 (1994).

Wang, H., "Retrieval of Mandarin Spoken Documents Based on Syllable Lattice Matching", Pattern Recognition Letters, vol. 21, pp. 615-624 (Jun. 2000).

F. Schiel et al., "The Partitur Format at BAS", In Proc. of the First Int'l. Conference on Language Resources and Evaluation, Granada, Spain, 1998.

C. Gerber, "A General Approach to Speech Recognition," Proceedings of the Final Workshop on Multimedia Information Retrieval (MIRO '95), Glasgow, Scotland, Sep. 18-20, 1995, pp. 0-12.

* cited by examiner

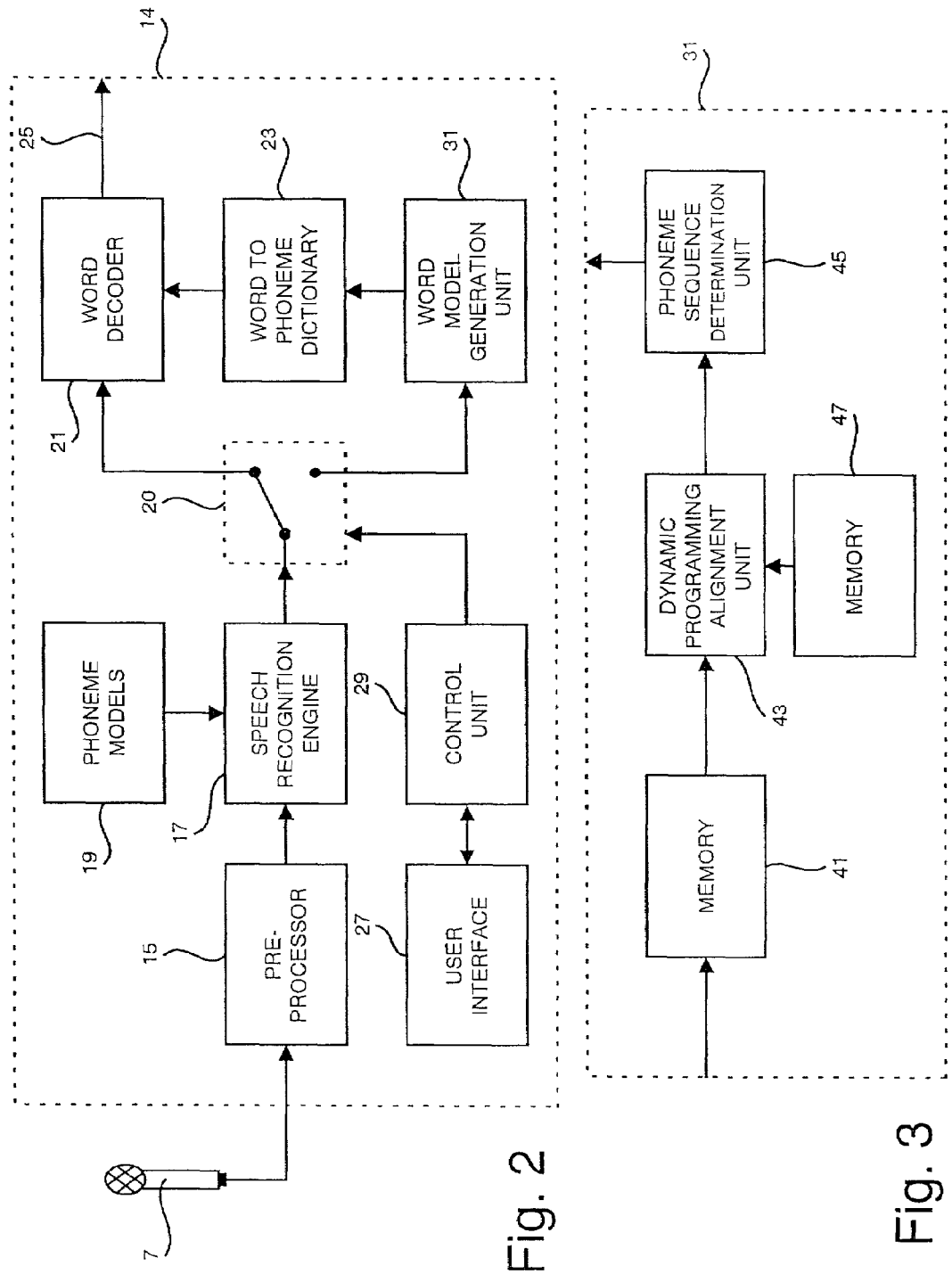

Fig. 17a

SPEECH PROCESSING SYSTEM

The present invention relates to the determination of phoneme or phoneme like models for words or commands which can be added to a word/command dictionary and used in speech processing related applications, such as speech recognition. The invention particularly relates to the generation of canonical and non-canonical phoneme sequences which represent the pronunciation of input words, which sequences can be used in speech processing applications.

The use of speech recognition systems is becoming more and more popular due the increased processing power available to perform the recognition operation. Most speech recognition systems can be classified into small vocabulary systems and large vocabulary systems. In small vocabulary systems the speech recognition engine usually compares the input speech to be recognised with acoustic patterns representative of the words known to the system. In the case of large vocabulary systems, it is not practical to store a word model for each word known to the system. Instead, the reference patterns usually represent phonemes of a given language. In this way, the input speech is compared with the phoneme patterns to generate a sequence of phonemes representative of the input speech. A word decoder is then used to identify words within the sequence of phonemes using a word to phoneme dictionary.

A problem with large vocabulary speech recognition systems is that if the user speaks a word which is not in the word dictionary, then a mis-recognition will occur and the speech recognition system will output the word or words which sound most similar to the out of vocabulary word actually spoken. This problem can be overcome by providing a mechanism which allows users to add new word models for out of vocabulary words. To date, this has predominantly been achieved by generating acoustic patterns representative of the out of vocabulary words. However, this requires the speech recognition system to match the input speech with two different types of model—phoneme models and word models, which slows down the recognition process. Other systems allow the user to add a phonetic spelling to the word dictionary in order to cater for out of vocabulary words. However, this requires the user to explicitly provide each phoneme for the new word and this is not practical for users who have a limited knowledge of the system and who do not know the phonemes which make up the word. An alternative technique would be to decode the new word into a sequence of phonemes using a speech recognition system and treat the decoded sequence of phonemes as being correct. However, as even the best systems today have an accuracy of less than 80%, this would introduce a number of errors which would ultimately lead to a lower recognition rate of the system.

One aim of the present invention is to provide an alternative technique for generating a phoneme or phoneme-like sequence representative of new words to be added to a word dictionary or command dictionary which may be used in, for example, a speech recognition system.

Exemplary embodiments of the present invention will now be described in more detail with reference to the accompanying drawings in which:

FIG. 2 is a schematic diagram of an overview of a speech recognition system embodying the present invention;

FIG. 3 is a schematic block diagram illustrating the main components of the word model generation unit which forms part of the speech recognition system shown in FIG. 2;

Figure 4:
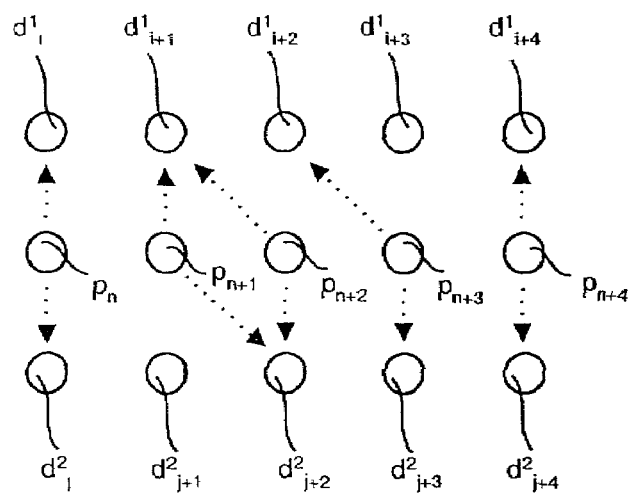
Figure 5:
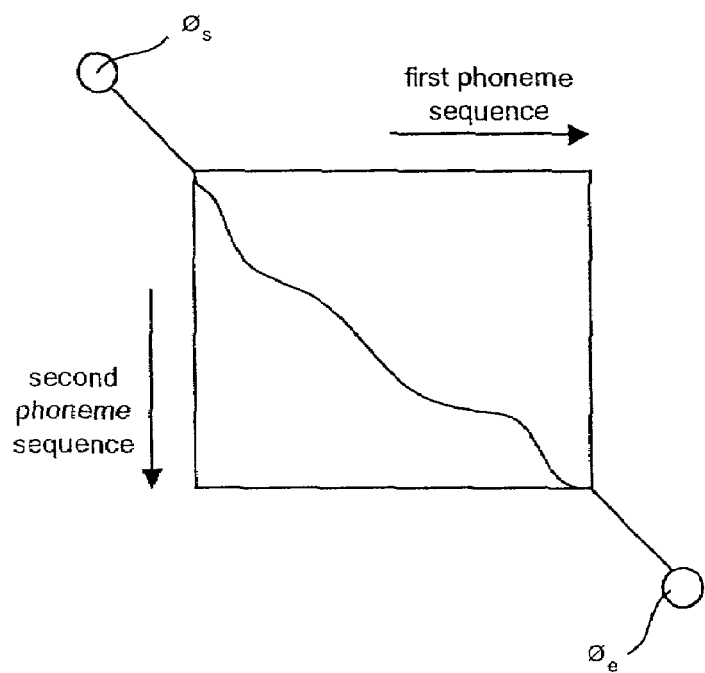
Figure 6:
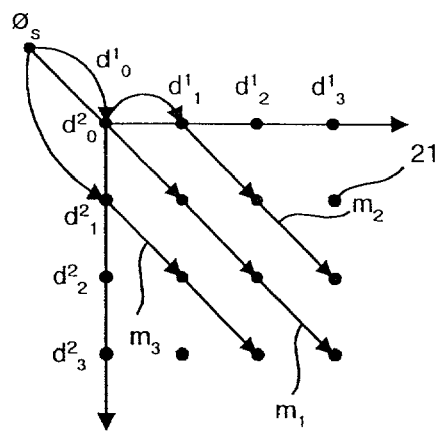
Figure 7:
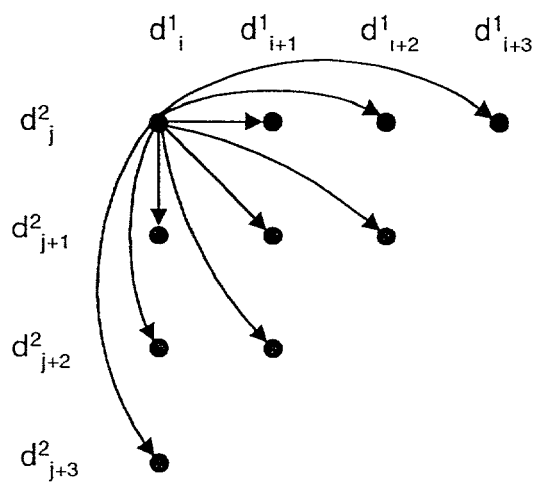
Figure 8:
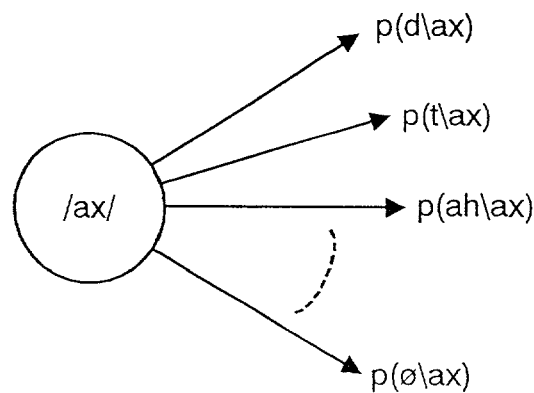
Figure 9:
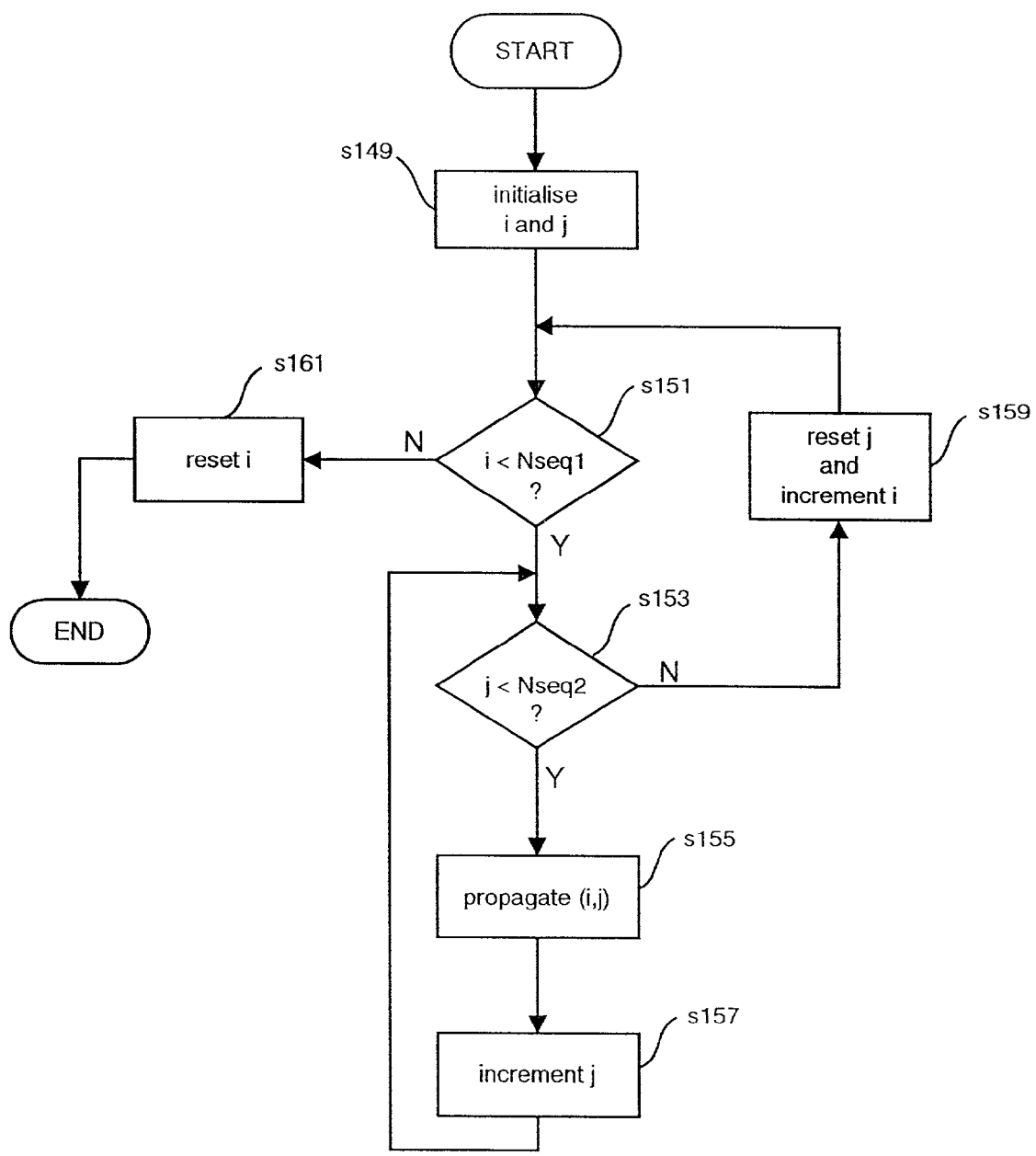
Figure 10:
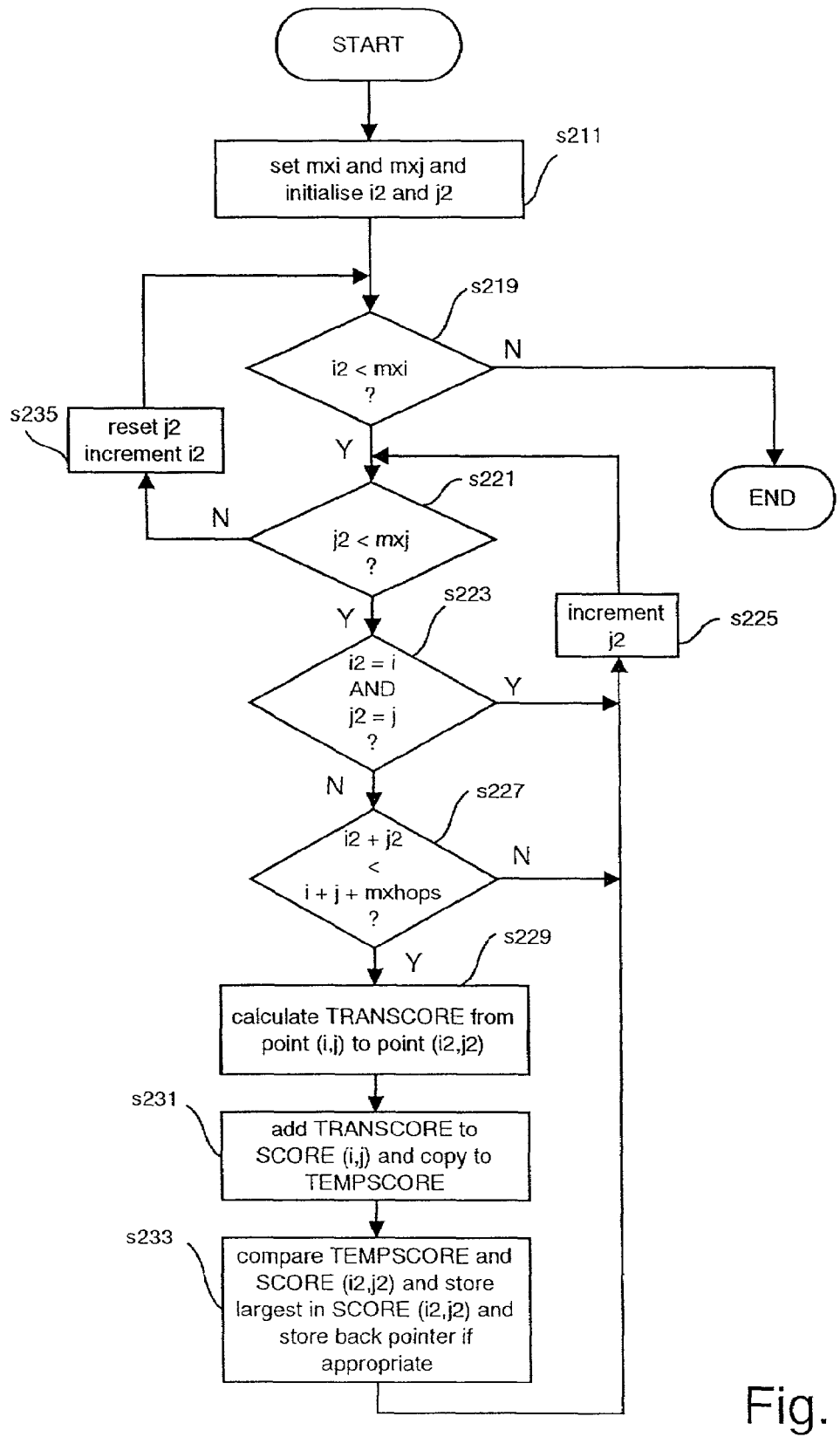
Figure 11:
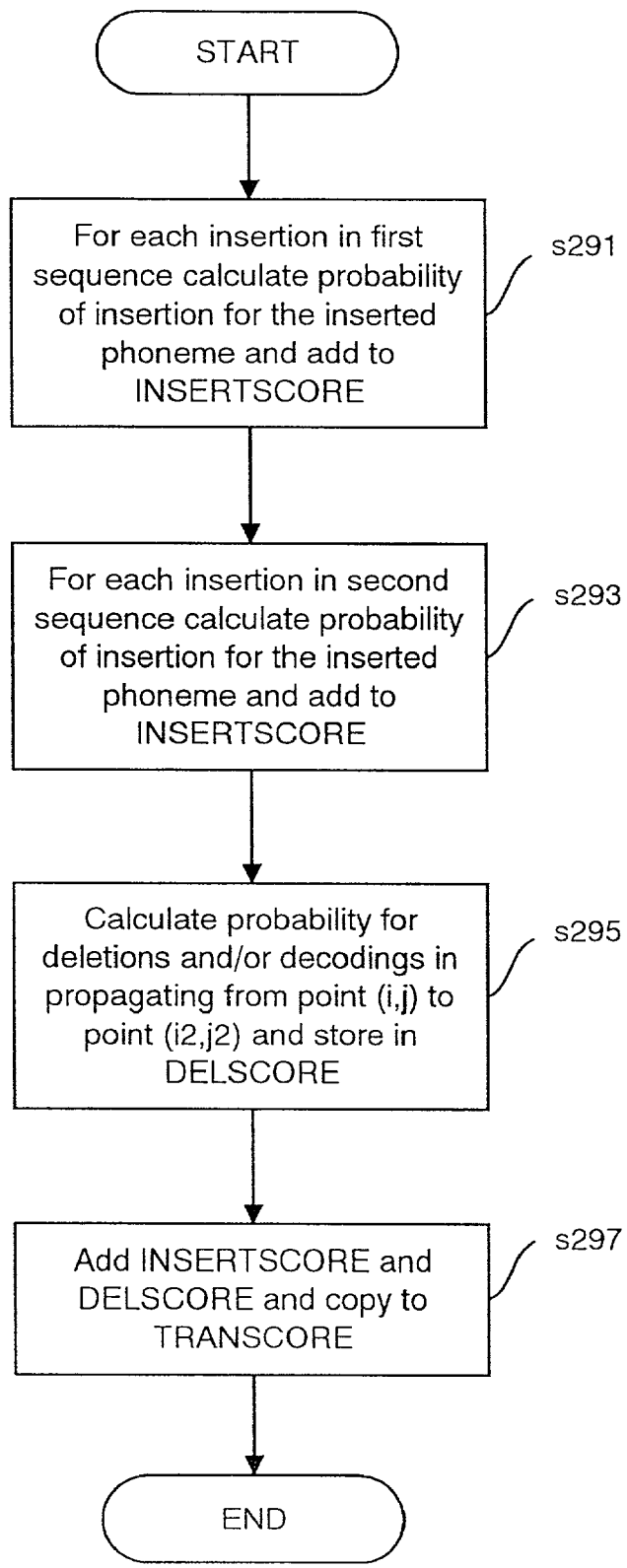
Figure 12:
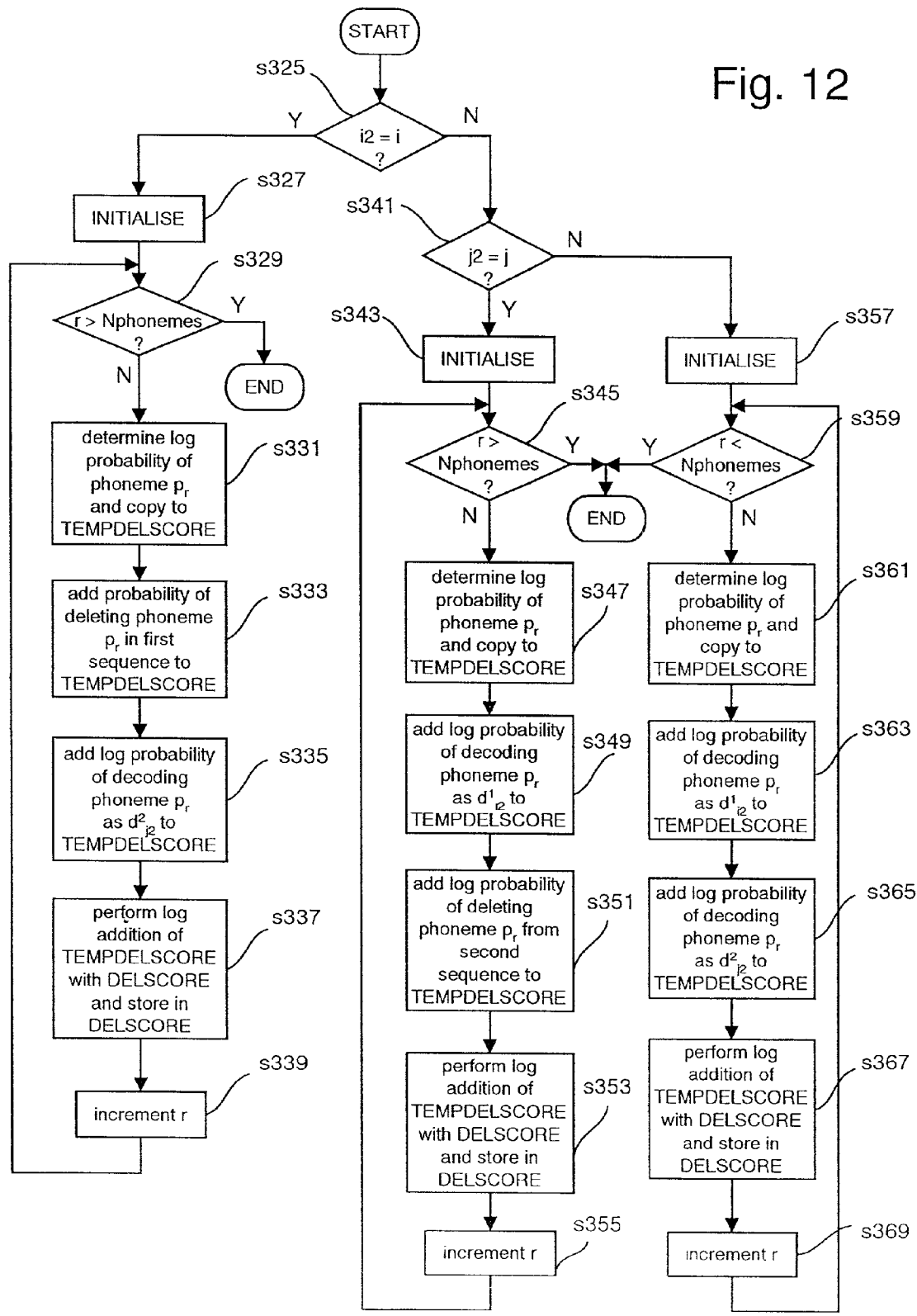
Figure 13:
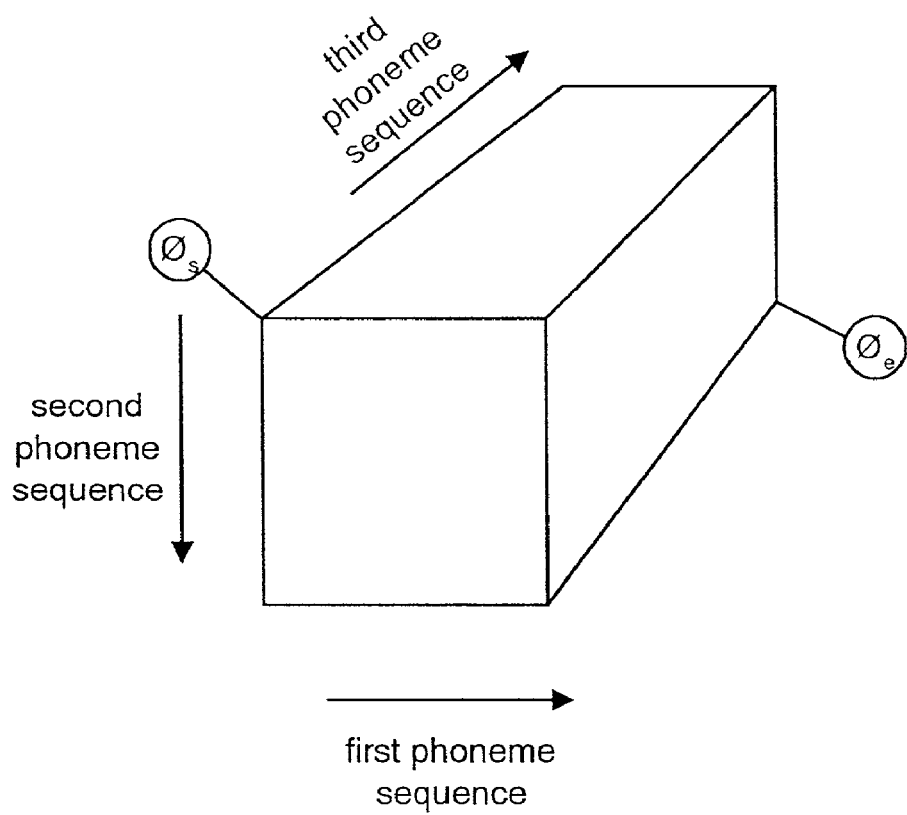
Figure 14:
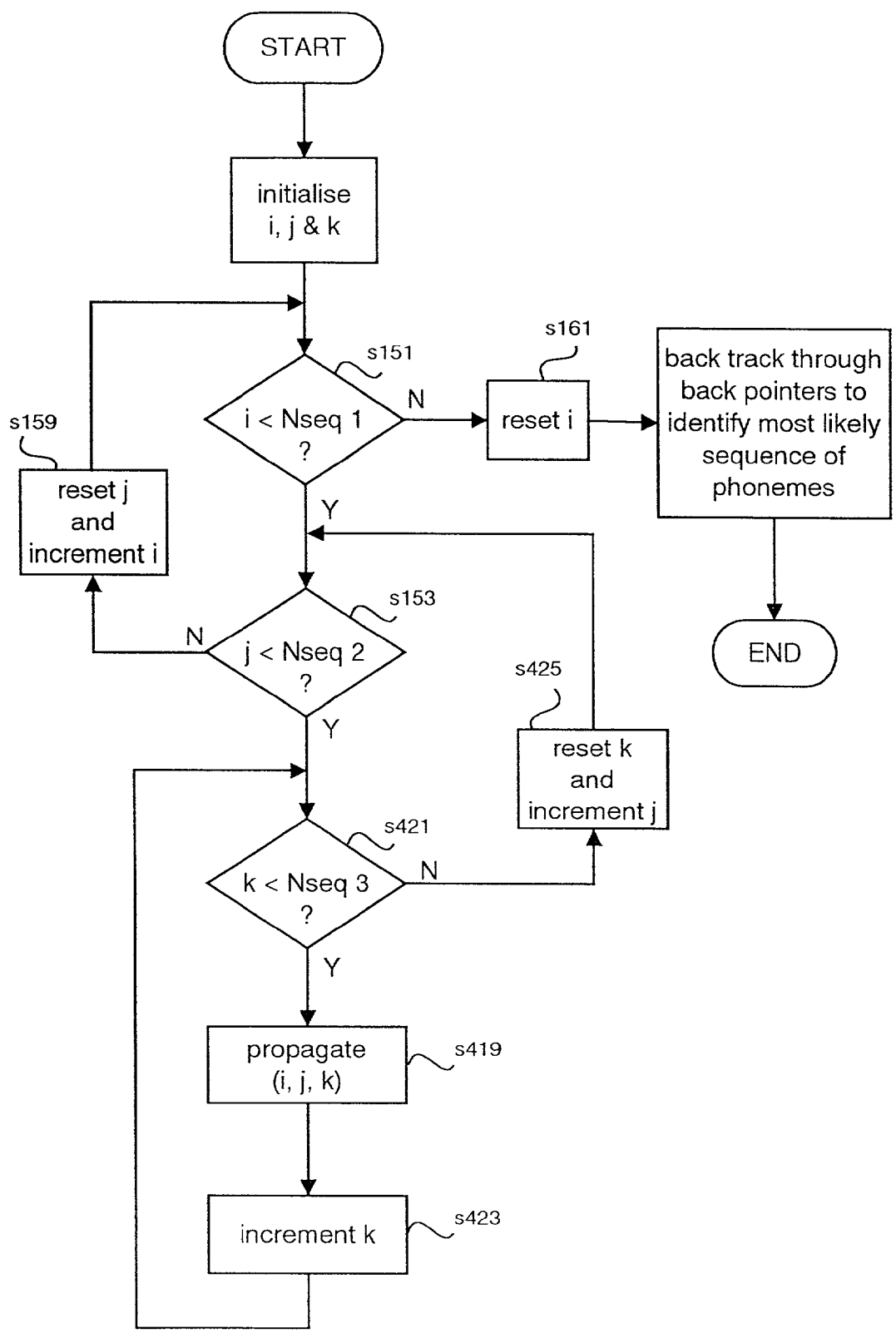
Figure 15:
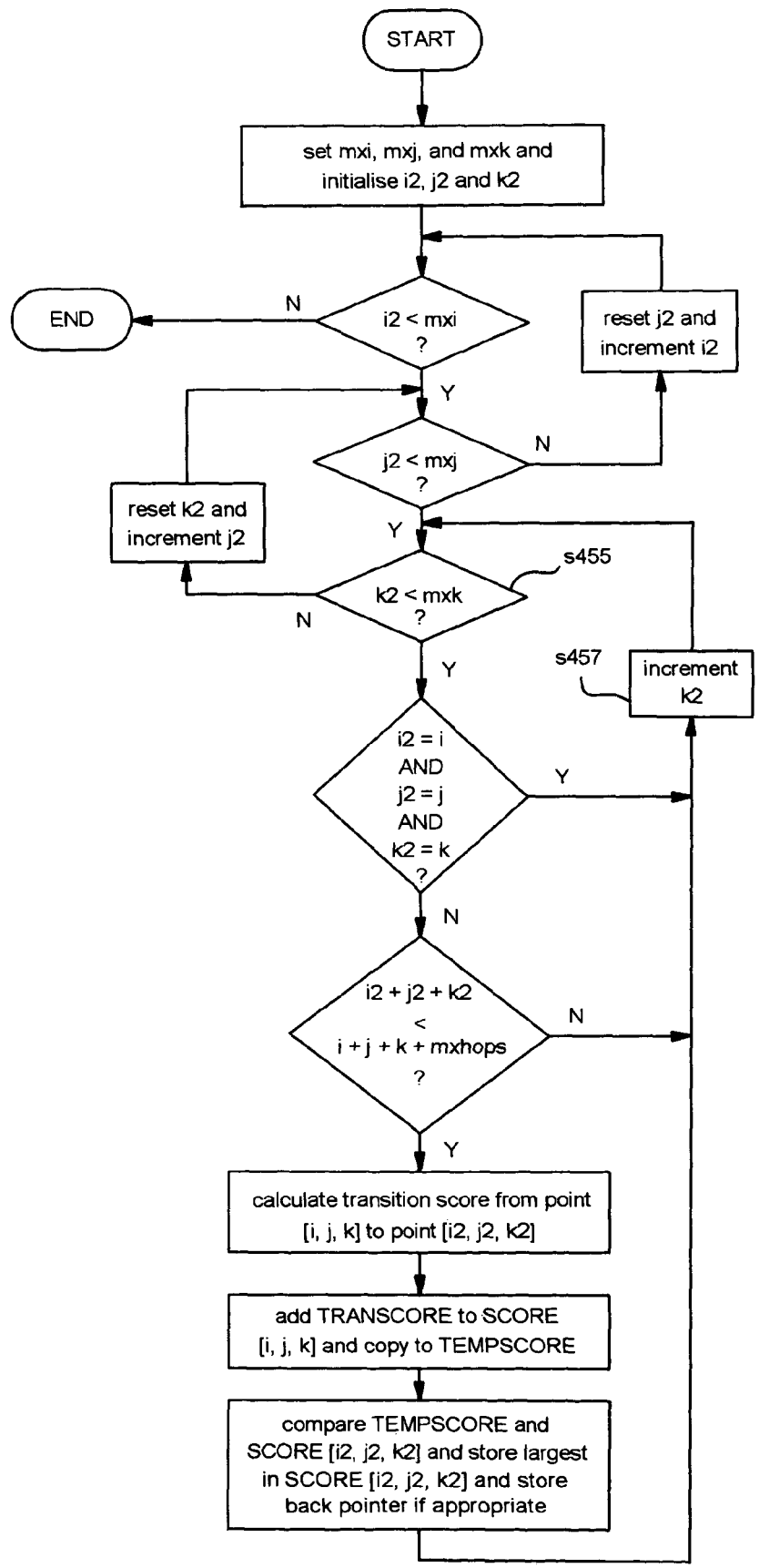
Figure 16:
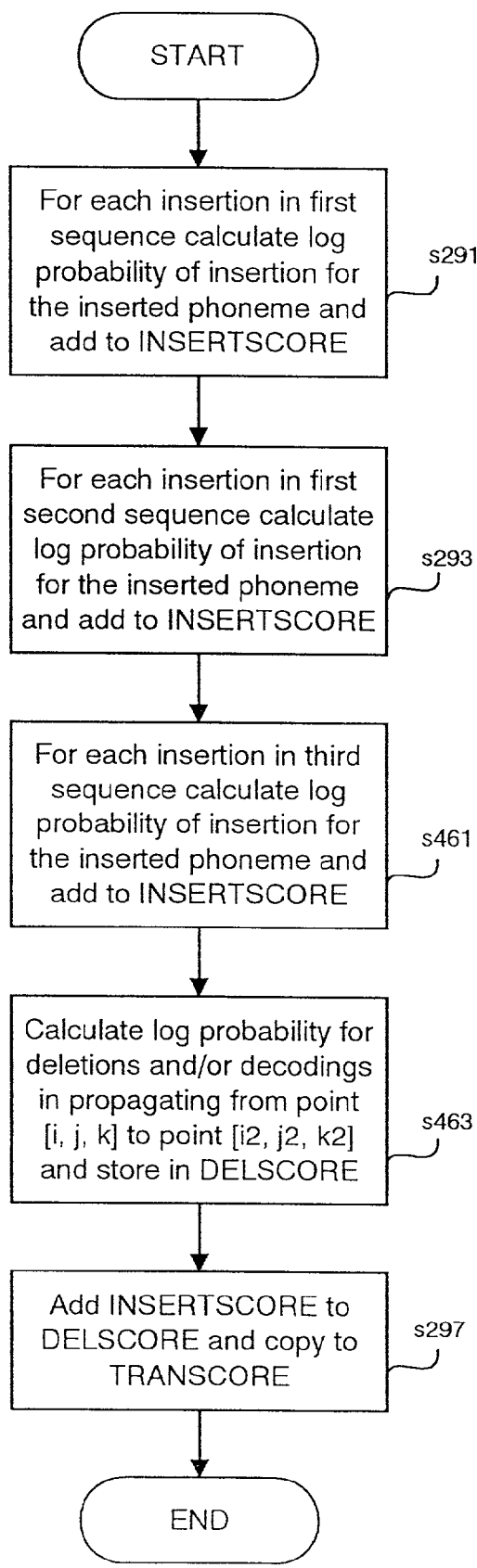
Figure 17B:
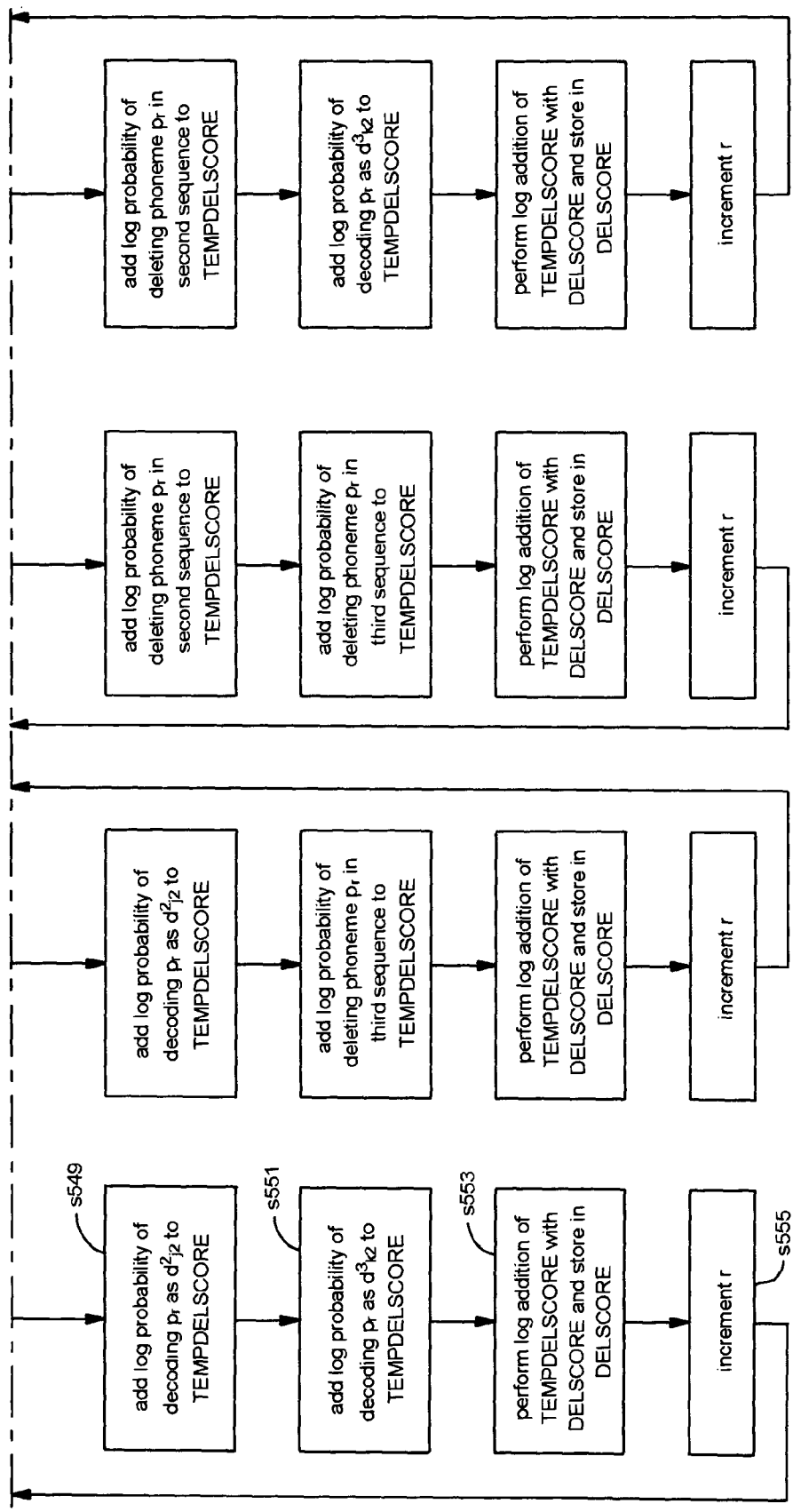
Figure 17C:
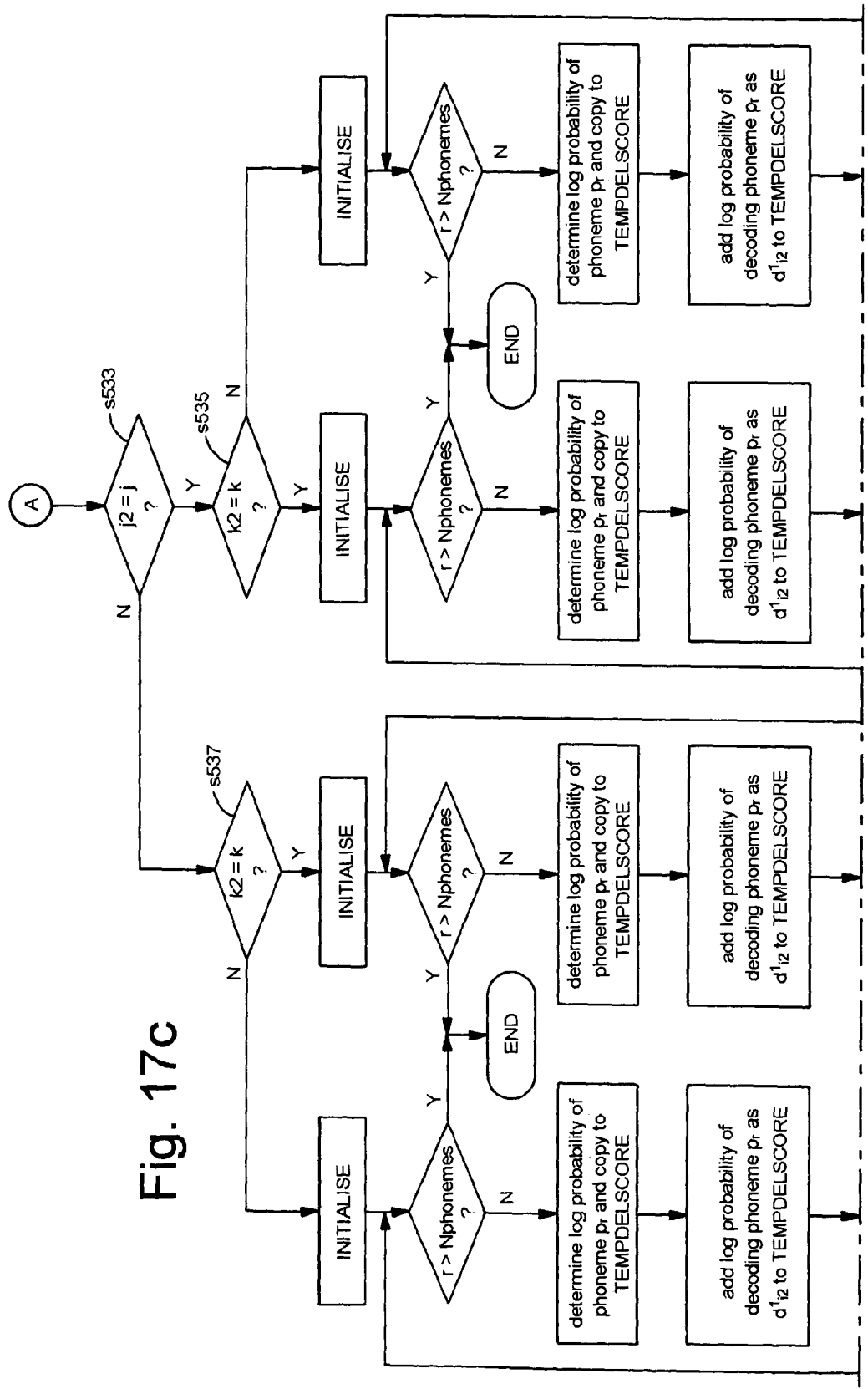
Figure 17D:
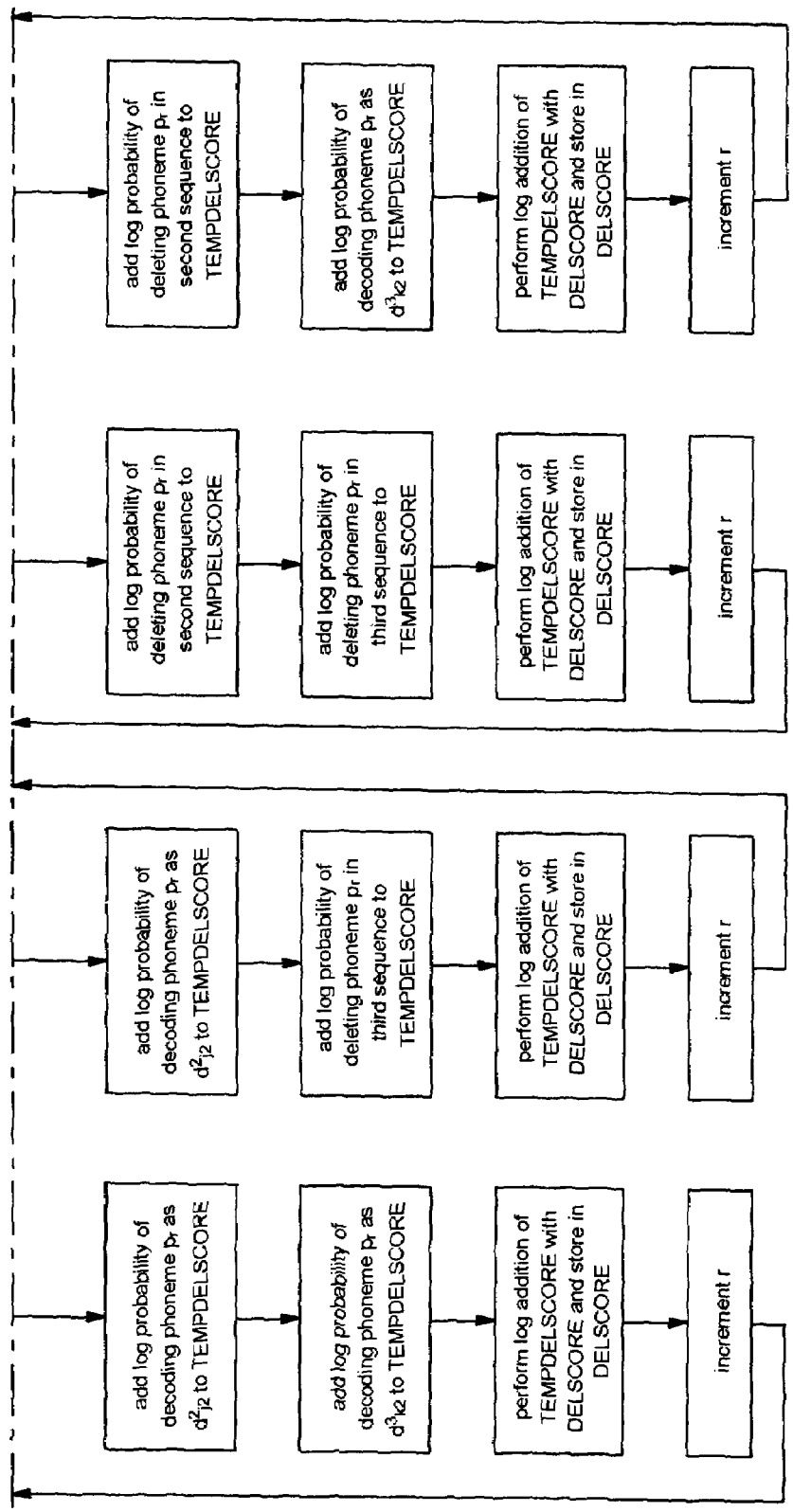
Figure 18:
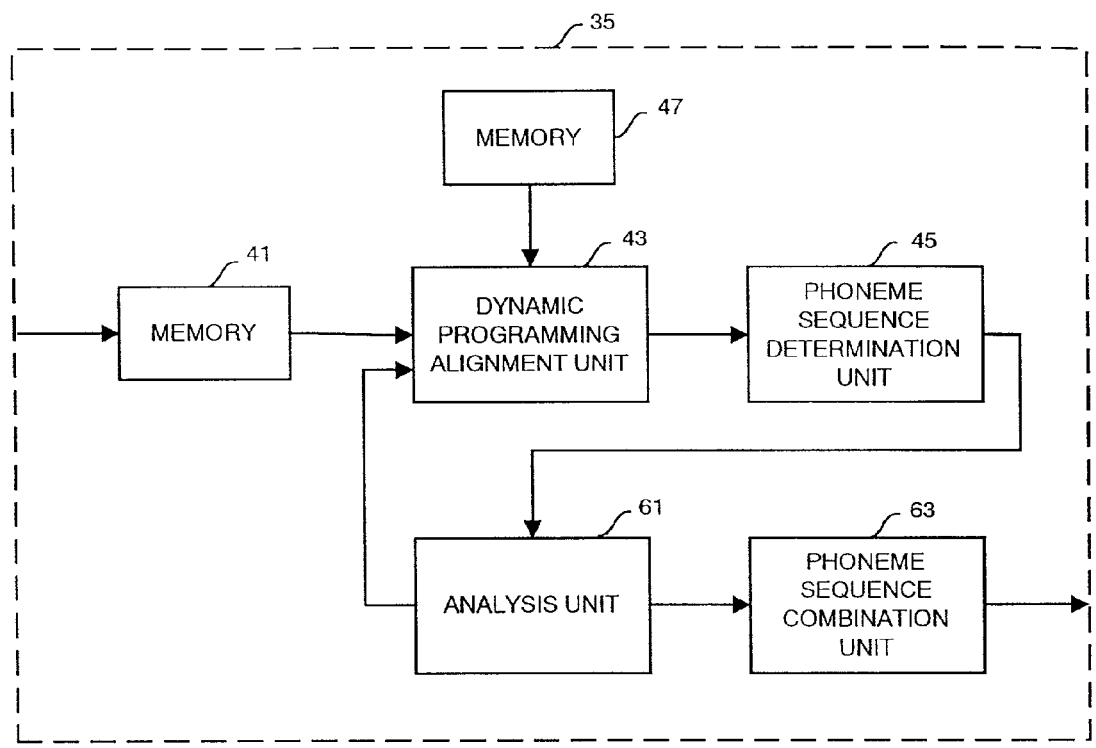
Figure 19:
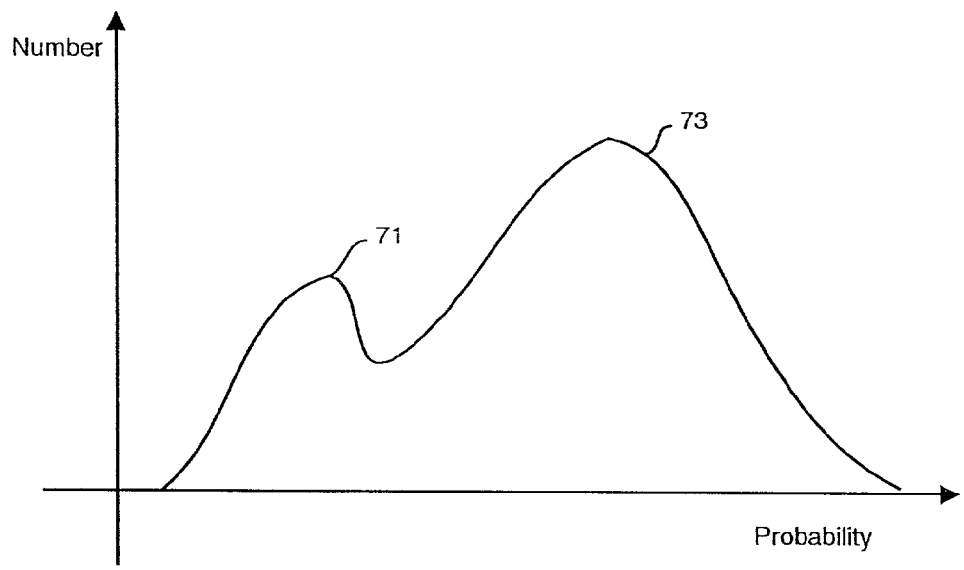
Figure 20:
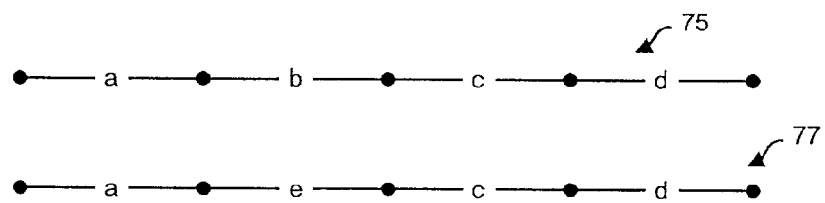

FIG. 4 is a schematic diagram which shows a first and second sequence of phonemes representative of two renditions of a new word after being processed by the speech recognition engine shown in FIG. 2, and a third sequence of phonemes which best represents the first and second sequence of phonemes, and which illustrates the possibility of there being phoneme insertions and deletions from the first and second sequence of phonemes relative to the third sequence of phonemes;

FIG. 5 schematically illustrates a search space created by the sequences of phonemes for the two renditions of the new word together with a start null node and an end null node;

FIG. 6 is a two-dimensional plot with the horizontal axis being provided for the phonemes corresponding to one rendition of the new word and the vertical axis being provided for the phonemes corresponding to the other rendition of the new word, and showing a number of lattice points, each corresponding to a possible match between a phoneme of the first rendition of the word and a phoneme of the second rendition of the word;

FIG. 7 schematically illustrates the dynamic programming constraints employed by the dynamic programming alignment unit which forms part of the word model generation unit shown in FIG. 3;

FIG. 8 schematically illustrates the deletion and decoding probabilities which are stored for an example phoneme and which are used in the scoring during the dynamic programming alignment process performed by the alignment unit shown in FIG. 3;

FIG. 9 is a flow diagram illustrating the main processing steps performed by the dynamic programming matching alignment unit shown in FIG. 3;

FIG. 10 is a flow diagram illustrating the main processing steps employed to propagate dynamic programming paths from the null start node to the null end node;

FIG. 11 is a flow diagram illustrating the processing steps involved in determining a transition score for propagating a path during the dynamic programming matching process;

FIG. 12 is a flow diagram illustrating the processing steps employed in calculating scores for deletions and decodings of the first and second phoneme sequences corresponding to the word renditions;

FIG. 13 schematically illustrates a search space created by three sequences of phonemes generated for three renditions of a new word;

FIG. 14 is a flow diagram illustrating the main processing steps employed to propagate dynamic programming paths from the null start node to the null end node shown in FIG. 13;

FIG. 15 is a flow diagram illustrating the processing steps employed in propagating a path during the dynamic programming process;

FIG. 16 is a flow diagram illustrating the processing steps involved in determining a transition score for propagating a path during the dynamic programming matching process;

Figure 17A:
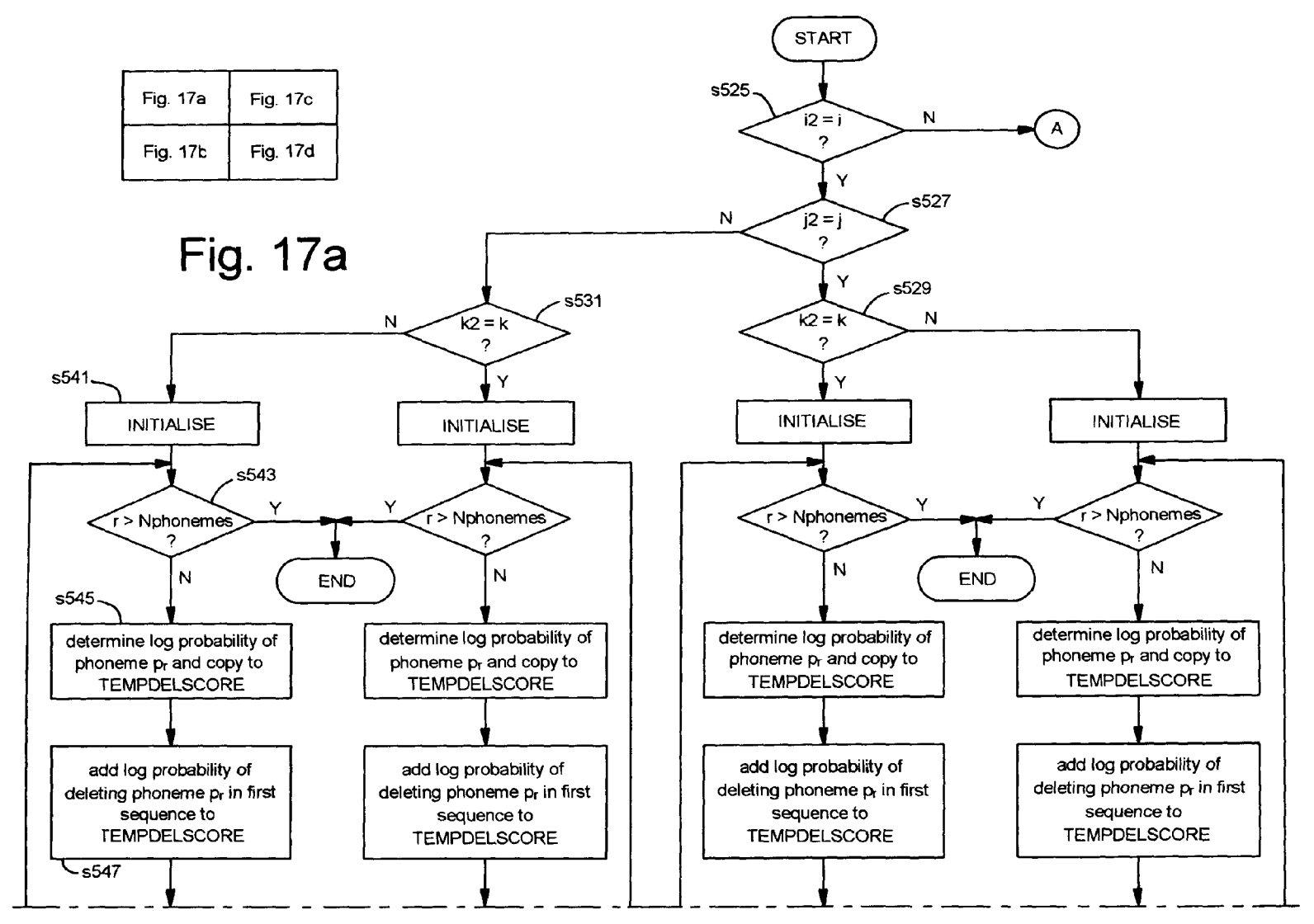

FIG. 17a is a flow diagram illustrating a first part of the processing steps employed in calculating scores for deletions and decodings of phonemes during the dynamic programming matching process;

FIG. 17b is a flow diagram illustrating a second part of the processing steps employed in calculating scores for deletions and decodings of phonemes during the dynamic programming matching process;

FIG. 17c is a flow diagram illustrating a third part of the processing steps employed in calculating scores for deletions and decodings of phonemes during the dynamic programming matching process;

FIG. 17d is a flow diagram illustrating the remaining steps employed in the processing steps employed in calculating scores for deletions and decodings of phonemes during the dynamic programming matching process;

FIG. 18 is a schematic block diagram illustrating the main components of an alternative word model generation unit which may be used in the speech recognition system shown in FIG. 2;

FIG. 19 is a plot illustrating the way in which probability scores vary with different pronunciations of input words;

FIG. 20 schematically illustrates two sequences of phonemes; and

Figure 21:
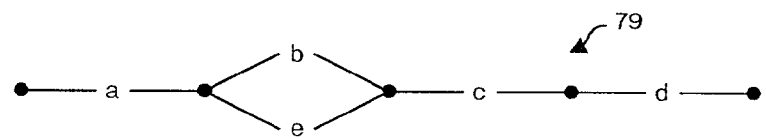

FIG. 21 schematically illustrates a phoneme lattice formed by combining the two phoneme sequences illustrated in FIG. 20.

FIRST EMBODIMENT

Embodiments of the present invention can be implemented using dedicated hardware circuits, but the embodiment that is to be described is implemented in computer software or code, which is run in conjunction with a personal computer. In alternative embodiments, the software may be run in conjunction with a workstation, photocopier, facsimile machine, personal digital assistant (PDA), web browser or the like.

Figure 1:
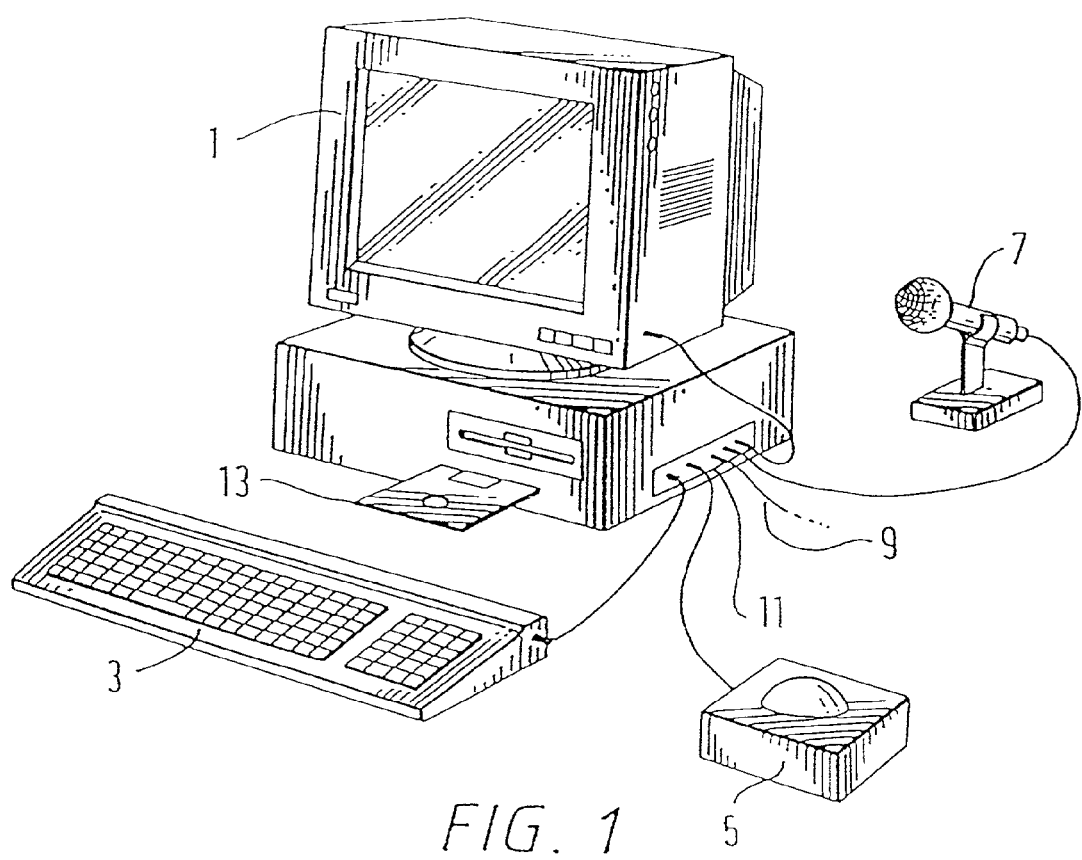
FIG. 1 is a schematic block view of a computer which may be programmed to operate an embodiment of the present invention.

FIG. 1 shows a personal computer (PC) 1 which is programmed to operate an embodiment of the present invention. A keyboard 3, a pointing device 5, a microphone 7 and a telephone line 9 are connected to the PC 1 via an interface 11. The keyboard 3 and pointing device enable the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The program instructions which make the PC 1 operate in accordance with the present invention may be supplied for use with the PC 1 on, for example, a storage device such as a magnetic disc 13 or by downloading the software from a remote computer over, for example, the Internet via the internal modem and telephone unit 9.

The operation of the speech recognition system 14 implemented in the PC 1 will now be described in more detail with reference to FIG. 2. Electrical signals representative of the user's input speech from the microphone 7 are applied to a preprocessor 15 which converts the input speech signal into a sequence of parameter frames, each representing a corresponding time frame of the input speech signal. The sequence of parameter frames output by the preprocessor 15 are then supplied to the speech recognition engine 17 where the speech is recognised by comparing the input sequence of parameter frames with phoneme models 19 to generate a sequence of phonemes representative of the input utterance. During the speech recognition systems 14 normal mode of operation, this sequence of phonemes are input, via a switch 20, to the word decoder 21 which identifies words within the generated phoneme sequence by comparing the phoneme sequence with those stored in a word to phoneme dictionary 23. The words 25 output by the word decoder 21 are then used by the PC 1 to either control the software applications running on the PC 1 or for insertion as text in a word processing program running on the PC 1.

In order to be able to add words to the word to phoneme dictionary 23, the speech recognition system 14 also has a training mode of operation. This is activated by the user applying an appropriate command through the user interface 27 using the keyboard 3 or the pointing device 5. This request to enter the training mode is passed to the control unit 29 which causes the switch 20 to connect the output of the speech recognition engine 17 to the input of a word model generation unit 31. At the same time, the control unit 29 outputs a prompt to the user, via the user interface 27, to provide several renditions of the word to be added. Each of these renditions is processed by the pre-processor 15 and the speech recognition engine 17 to generate a plurality of sequences of phonemes representative of a respective rendition of the new word. These sequences of phonemes are input to the word model generation unit 31 which processes them to identify the most probable phoneme sequence which could have been mis-recognised as all the training examples and this sequence is stored together with a typed version of the word input by the user, in the word to phoneme dictionary 23. After the user has finished adding words to the dictionary 23, the control unit 29 returns the speech recognition system 14 to its normal mode of operation by connecting the output of the speech recognition engine back to the word decoder 21 through the switch 20.

Word Training

FIG. 3 shows in more detail the components of the word model generation unit 31 discussed above. As shown, there is a memory 41 which receives each phoneme sequence output from the speech recognition engine 17 for each of the renditions of the new word input by the user. After the user has finished inputting the training examples (which is determined from an input received from the user through the user interface 27), the phoneme sequences stored in the memory 41 are applied to the dynamic programming alignment unit 43 which, in this embodiment, uses a dynamic programming alignment technique to compare the phoneme sequences and to determine the best alignment between them. In this embodiment, the alignment unit 43 performs the comparison and alignment of all the phoneme sequences at the same time. The identified alignment between the input sequences is then input to a phoneme sequence determination unit 45, which uses this alignment to determine the sequence of phonemes which matches best with the input phoneme sequences.

As those skilled in the art will appreciate, each phoneme sequence representative of a rendition of the new word can have insertions and deletions relative to this unknown sequence of phonemes which matches best with all the input sequences of phonemes. This is illustrated in FIG. 4, which shows a possible matching between a first phoneme sequence (labelled $d^1_i$, $d^1_{i+1}$, $d^1_{i+2}$ ...) representative of a first rendition of the new word, a second phoneme sequence (labelled $d^2_j$, $d^2_{j+1}$, $d^2_{j+2}$ ...) representative of a second rendition of the new word and a sequence of phonemes (labelled $p_n$, $p_{n+1}$, $p_{n+2}$ ...) which represents a canonical sequence of phonemes of the text which best matches the two input sequences. As shown in FIG. 4, the dynamic programming alignment unit 43 must allow for the insertion of phonemes in both the first and second phoneme sequences (represented by the inserted phonemes $d^1_{i+3}$ and $d^2_{j+1}$) as well as the deletion of phonemes from the first and second phoneme sequences (represented by phonemes $d^1_{i+1}$ and $d^2_{j+2}$, which are both aligned with two phonemes in the canonical sequence of phonemes), relative to the canonical sequence of phonemes.

Overview of DP Alignment

As those skilled in the art of speech processing know, dynamic programming is a technique which can be used to find the optimum alignment between sequences of features, which in this embodiment are phonemes. In the simple case where there are two renditions of the new word (and hence only two sequences of phonemes to be aligned), the dynamic programming alignment unit 43 calculates the optimum alignment by simultaneously propagating a plurality of dynamic programming paths, each of which represents a possible alignment between a sequence of phonemes from the first sequence (representing the first rendition) and a sequence of phonemes from the second sequence (representing the second rendition). All paths begin at a start null node which is at the beginning of the two input sequences of phonemes and propagate until they reach an end null node, which is at the end of the two sequences of phonemes.

FIGS. 5 and 6 schematically illustrate the alignment which is performed and this path propagation. In particular, FIG. 5 shows a rectangular coordinate plot with the horizontal axis being provided for the first phoneme sequence representative of the first rendition and the vertical axis being provided for the second phoneme sequence representative of the second rendition. The start null node $\emptyset_s$ is provided at the top left hand corner and the end null node $\emptyset_e$ is provided at the bottom right hand corner. As shown in FIG. 6, the phonemes of the first sequence are provided along the horizontal axis and the phonemes of the second sequence are provided down the vertical axis. FIG. 6 also shows a number of lattice points, each of which represents a possible alignment (or decoding) between a phoneme of the first phoneme sequence and a phoneme of the second phoneme sequence. For example, lattice point 21 represents a possible alignment between first sequence phoneme $d^1_3$ and second sequence phoneme $d^2_1$. FIG. 6 also shows three dynamic programming paths $m_1$, $m_2$ and $m_3$ which represent three possible alignments between the first and second phoneme sequences and which begin at the start null node $\emptyset_s$ and propagate through the lattice points to the end null node $\emptyset_e$.

In order to determine the best alignment between the first and second phoneme sequences, the dynamic programming alignment unit 43 keeps a score for each of the dynamic programming paths which it propagates, which score is dependent upon the overall similarity of the phonemes which are aligned along the path. Additionally, in order to limit the number of deletions and insertions of phonemes in the sequences being aligned, the dynamic programming process places certain constraints on the way in which each dynamic programming path can propagate.

FIG. 7 shows the dynamic programming constraints which are used in this embodiment. In particular, if a dynamic programming path ends at lattice point (i,j), representing an alignment between phoneme $d^1_i$ of the first phoneme sequence and phoneme $d^2_j$ of the second phoneme sequence, then that dynamic programming path can propagate to the lattice points (i+1,j), (i+2,j), (i+3,j), (i,j+1), (i+1,j+1), (i+2,j+1), (i,j+2), (i+1,j+2) and (i,j+3). These propagations therefore allow the insertion and deletion of phonemes in the first and second phoneme sequences relative to the unknown canonical sequence of phonemes corresponding to the text of what was actually spoken.

As mentioned above, the dynamic programming alignment unit 78 keeps a score for each of the dynamic programming paths, which score is dependent upon the similarity of the phonemes which are aligned along the path. Therefore, when propagating a path ending at point (i,j) to these other points, the dynamic programming process adds the respective "cost" of doing so to the cumulative score for the path ending at point (i,j), which is stored in a store (SCORE(i,j)) associated with that point. In this embodiment, this cost includes insertion probabilities for any inserted phonemes, deletion probabilities for any deletions and decoding probabilities for a new alignment between a phoneme from the first phoneme sequence and a phoneme from the second phoneme sequence. In particular, when there is an insertion, the cumulative score is multiplied by the probability of inserting the given phoneme; when there is a deletion, the cumulative score is multiplied by the probability of deleting the phoneme; and when there is a decoding, the cumulative score is multiplied by the probability of decoding the two phonemes.

In order to be able to calculate these probabilities, the system stores a probability for all possible phoneme combinations in memory 47. In this embodiment, the deletion of a phoneme from either the first or second phoneme sequence is treated in a similar manner to a decoding. This is achieved by simply treating a deletion as another phoneme. Therefore, if there are 43 phonemes known to the system, then the system will store one thousand eight hundred and ninety two (1892=43×44) decoding/deletion probabilities, one for each possible phoneme decoding and deletion. This is illustrated in FIG. 8, which shows the possible phoneme decodings which are stored for the phoneme /ax/ and which includes the deletion phoneme (∅) as one of the possibilities. As those skilled in the art will appreciate, all the decoding probabilities for a given phoneme must sum to one, since there are no other possibilities. In addition to these decoding/deletion probabilities, 43 insertion probabilities (PI( )), one for each possible phoneme insertion, is also stored in the memory 47. As will be described later, these probabilities are determined in advance from training data.

In this embodiment, to calculate the probability of decoding a phoneme ($d^2_j$) from the second phoneme sequence as a phoneme ($d^1_i$) from the first phoneme sequence, the system sums, over all possible phonemes p, the probability of decoding the phoneme p as the first sequence phoneme $d^1_i$ and as the second sequence phoneme $d^2_j$, weighted by the probability of phoneme p occurring unconditionally, i.e.:

$$P(d^1_i \mid d^2_j) = \sum_{r=1}^{N_p} P(d^1_i \mid p_r) P(d^2_j \mid p_r) P(p_r) \quad (1)$$

where $N_p$ is the total number of phonemes known to the system; $P(d^1_i \mid p_r)$ is the probability of decoding phoneme $p_r$ as the first sequence phoneme $d^1_i$; $P(d^2_j \mid p_r)$ is the probability of decoding phoneme $p_r$ as the second sequence phoneme $d^2_j$; and $P(p_r)$ is the probability of phoneme $p_r$ occurring unconditionally.

To illustrate the score propagations, an example will now be considered. In particular, when propagating from lattice point (i,j) to lattice point (i+2,j+1), the phoneme $d^1_{i+1}$ from the first phoneme sequence is inserted relative to the second phoneme sequence and there is a decoding between phoneme $d^1_{i+2}$ from the first phoneme sequence and phoneme $d_{j+1}^2$ from the second phoneme sequence. Therefore, the score propagated to point (i+2,j+1) is given by:

$$S(i+2, j+1) = S(i, j) \cdot Pl(d_{i+1}^1) \cdot \sum_{r=1}^{N_p} P(d_{i+2}^1 \mid p_r) P(d_{j+1}^2 \mid p_r) P(p_r) \quad (2)$$

As those skilled in the art will appreciate, during this path propagation, several paths will meet at the same lattice point. In order that the best path is propagated, a comparison between the scores is made at each lattice point and the path having the best score is continued whilst the other path(s) is (are) discarded. In order that the best alignment between the two input phoneme sequences can be determined, where paths meet and paths are discarded, a back pointer is stored pointing to the lattice point from which the path which was not discarded, propagated. In this way, once the dynamic programming alignment unit 78 has propagated the paths through to the null end node and the path having the overall best score has been determined, a back tracking routine can be used to identify the best alignment of the phonemes in the two input phoneme sequences. The phoneme sequence determination unit 79 then uses this alignment, to determine the sequence of phonemes which best represents the input phoneme sequences. The way in which this is achieved in this embodiment will be described later.

DETAILED DESCRIPTION OF DP ALIGNMENT

A more detailed description will now be given of the operation of the dynamic programming alignment unit 43 when two sequences of phonemes (for two renditions of the new word), are aligned. Initially, the scores associated with all the nodes are set to an appropriate initial value. The alignment unit 43 then propagates paths from the null start node ($\emptyset_s$) to all possible start points defined by the dynamic programming constraints discussed above. The dynamic programming score for the paths that are started are then set to equal the transition score for passing from the null start node to the respective start point. The paths which are started in this way are then propagated through the array of lattice points defined by the first and second phoneme sequences until they reach the null end node $\emptyset_e$. To do this, the alignment unit 78 processes the array of lattice points column by column in a raster like technique.

The control algorithm used to control this raster processing operation is shown in FIG. 9. As shown, in step s149, the system initialises a first phoneme sequence loop pointer, i, and a second phoneme loop pointer, j, to zero. Then in step s151, the system compares the first phoneme sequence loop pointer i with the number of phonemes in the first phoneme sequence (Nseq1). Initially the first phoneme sequence loop pointer i is set to zero and the processing therefore proceeds to step s153 where a similar comparison is made for the second phoneme sequence loop pointer j relative to the total number of phonemes in the second phoneme sequence (Nseq2). Initially the loop pointer j is also set to zero and therefore the processing proceeds to step s155 where the system propagates the path ending at lattice point (i,j) using the dynamic programming constraints discussed above. The way in which the system propagates the paths in step s155 will be described in more detail later. After step s155, the loop pointer j is incremented by one in step s157 and the processing returns to step s153. Once this processing has looped through all the phonemes in the second phoneme sequence (thereby processing the current column of lattice points), the processing proceeds to step s159 where the loop pointer j is reset to zero and the loop pointer i is incremented by one. The processing then returns to step s151 where a similar procedure is performed for the next column of lattice points. Once the last column of lattice points has been processed, the processing proceeds to step s161 where the loop pointer i is reset to zero and the processing ends.

Propagate

In step s155 shown in FIG. 9, the system propagates the path ending at lattice point (i,j) using the dynamic programming constraints discussed above. FIG. 10 is a flowchart which illustrates the processing steps involved in performing this propagation step. As shown, in step s211, the system sets the values of two variables mxi and mxj and initialises first phoneme sequence loop pointer i2 and second phoneme sequence loop pointer j2. The loop pointers i2 and j2 are provided to loop through all the lattice points to which the path ending at point (i,j) can propagate to and the variables mxi and mxj are used to ensure that i2 and j2 can only take the values which are allowed by the dynamic programming constraints. In particular, mxi is set equal to i plus mxhops (which is a constant having a value which is one more than the maximum number of "hops" allowed by the dynamic programming constraints and in this embodiment is set to a value of four, since a path can jump at most to a phoneme that is three phonemes further along the sequence), provided this is less than or equal to the number of phonemes in the first phoneme sequence, otherwise mxi is set equal to the number of phonemes in the first phoneme sequence (Nseq1). Similarly, mxj is set equal to j plus mxhops, provided this is less than or equal to the number of phonemes in the second phoneme sequence, otherwise mxj is set equal to the number of phonemes in the second phoneme sequence (Nseq2). Finally, in step s211, the system initialises the first phoneme sequence loop pointer i2 to be equal to the current value of the first phoneme sequence loop pointer i and the second phoneme sequence loop pointer j2 to be equal to the current value of the second phoneme sequence loop pointer j.

The processing then proceeds to step s219 where the system compares the first phoneme sequence loop pointer i2 with the variable mxi. Since loop pointer i2 is set to i and mxi is set equal to i+4, in step s211, the processing will proceed to step s221 where a similar comparison is made for the second phoneme sequence loop pointer j2. The processing then proceeds to step s223 which ensures that the path does not stay at the same lattice point (i,j) since initially, i2 will equal i and j2 will equal j. Therefore, the processing will initially proceed to step s225 where the query phoneme loop pointer j2 is incremented by one.

The processing then returns to step s221 where the incremented value of j2 is compared with mxj. If j2 is less than mxj, then the processing returns to step s223 and then proceeds to step s227, which is operable to prevent too large a hop along both phoneme sequences. It does this by ensuring that the path is only propagated if i2+j2 is less than i+j+mxhops. This ensures that only the triangular set of points shown in FIG. 7 are processed. Provided this condition is met, the processing proceeds to step s229 where the system calculates the transition score (TRANSCORE) from lattice point (i,j) to lattice point (i2,j2). In this embodiment, the transition and cumulative scores are probability based and they are combined by multiplying the probabilities together. However, in this embodiment, in order to remove the need to perform multiplications and in order to avoid the use of high floating point precision, the system employs log probabilities for the transition and cumulative scores. Therefore, in step s231, the system adds this transition score to the cumulative score stored for the point (i,j) and copies this to a temporary store, TEMPSCORE.

As mentioned above, in this embodiment, if two or more dynamic programming paths meet at the same lattice point, the cumulative scores associated with each of the paths are compared and all but the best path (i.e. the path having the best score) are discarded. Therefore, in step s233, the system compares TEMPSCORE with the cumulative score already stored for point (i2,j2) and the largest score is stored in SCORE (i2,j2) and an appropriate back pointer is stored to identify which path had the larger score. The processing then returns to step s225 where the loop pointer j2 is incremented by one and the processing returns to step s221. Once the second phoneme sequence loop pointer j2 has reached the value of mxj, the processing proceeds to step s235, where the loop pointer j2 is reset to the initial value j and the first phoneme sequence loop pointer i2 is incremented by one. The processing then returns to step s219 where the processing begins again for the next column of points shown in FIG. 7. Once the path has been propagated from point (i,j) to all the other points shown in FIG. 7, the processing ends.

Transition Score

In step s229 the transition score from one point (i,j) to another point (i2,j2) is calculated. This involves calculating the appropriate insertion probabilities, deletion probabilities and decoding probabilities relative to the start point and end point of the transition. The way in which this is achieved in this embodiment, will now be described with reference to FIGS. 11 and 12.

In particular, FIG. 11 shows a flow diagram which illustrates the general processing steps involved in calculating the transition score for a path propagating from lattice point (i,j) to lattice point (i2,j2). In step s291, the system calculates, for each first sequence phoneme which is inserted between point (i,j) and point (i2,j2), the score for inserting the inserted phoneme(s) (which is just the log of probability PI( ) discussed above) and adds this to an appropriate store, INSERTSCORE. The processing then proceeds to step s293 where the system performs a similar calculation for each second sequence phoneme which is inserted between point (i,j) and point (i2,j2) and adds this to INSERTSCORE. As mentioned above, the scores which are calculated are log based probabilities, therefore the addition of the scores in INSERTSCORE corresponds to the multiplication of the corresponding insertion probabilities. The processing then proceeds to step s295 where the system calculates (in accordance with equation (1) above) the scores for any deletions and/or any decodings in propagating from point (i,j) to point (i2,j2) and these scores are added and stored in an appropriate store, DELSCORE. The processing then proceeds to step s297 where the system adds INSERTSCORE and DELSCORE and copies the result to TRANSCORE.

The processing involved in step s295 to determine the deletion and/or decoding scores in propagating from point (i,j) to point (i2,j2) will now be described in more detail with reference to FIG. 12. As shown, initially in step s325, the system determines if the first phoneme sequence loop pointer i2 equals first phoneme sequence loop pointer i. If it does, then the processing proceeds to step s327 where a phoneme loop pointer r is initialised to one. The phoneme pointer r is used to loop through each possible phoneme known to the system during the calculation of equation (1) above. The processing then proceeds to step s329, where the system compares the phoneme pointer r with the number of phonemes known to the system, Nphonemes (which in this embodiment equals 43). Initially r is set to one in step s327, therefore the processing proceeds to step s331 where the system determines the log probability of phoneme $p_r$ occurring (i.e. log $P(p_r)$) and copies this to a temporary score TEMPDELSCORE. If first phoneme sequence loop pointer i2 equals annotation phoneme i, then the system is propagating the path ending at point (i,j) to one of the points (i,j+1), (i,j+2) or (i,j+3). Therefore, there is a phoneme in the second phoneme sequence which is not in the first phoneme sequence. Consequently, in step s333, the system adds the log probability of deleting phoneme $p_r$ from the first phoneme sequence (i.e. log $P(0|p_r)$) to TEMPDELSCORE. The processing then proceeds to step s335, where the system adds the log probability of decoding phoneme $p_r$ as second sequence phoneme $d^2_{j2}$ (i.e. log $P(d^2_{j2}|p_r)$) to TEMPDELSCORE. The processing then proceeds to step s337 where a "log addition" of TEMPDELSCORE and DELSCORE is performed and the result is stored in DELSCORE.

In this embodiment, since the calculation of decoding probabilities (in accordance with equation (1) above) involves summations and multiplications of probabilities, and since we are using log probabilities, this "log addition" operation effectively converts TEMDELSCORE and DELSCORE from log probabilities back to probabilities, adds them and then reconverts them back to log probabilities. This "log addition" is a well known technique in the art of speech processing and is described in, for example, the book entitled "Automatic Speech Recognition. The development of the (Sphinx) system" by Lee, Kai-Fu published by Kluwer Academic Publishers, 1989, at pages 28 and 29. After step s337, the processing proceeds to step s339 where the phoneme loop pointer r is incremented by one and then the processing returns to step s329 where a similar processing is performed for the next phoneme known to the system. Once this calculation has been performed for each of the 43 phonemes known to the system, the processing ends.

If at step s325, the system determines that i2 is not equal to i, then the processing proceeds to step s341 where the system determines if the second phoneme sequence loop pointer j2 equals second phoneme sequence loop pointer j. If it does, then the processing proceeds to step s343 where the phoneme loop pointer r is initialised to one. The processing then proceeds to step s345 where the phoneme loop pointer r is compared with the total number of phonemes known to the system (Nphonemes). Initially r is set to one in step s343, and therefore, the processing proceeds to step s347 where the log probability of phoneme $p_r$ occurring is determined and copied into the temporary store TEMPDELSCORE. The processing then proceeds to step s349 where the system determines the log probability of decoding phoneme $p_r$ as first sequence phoneme $d^1_{i2}$ and adds this to TEMPDELSCORE. If the second phoneme sequence loop pointer j2 equals loop pointer j, then the system is propagating the path ending at point (i,j) to one of the points (i+1,j), (i+2,j) or (i+3,j). Therefore, there is a phoneme in the first phoneme sequence which is not in the second phoneme sequence. Consequently, in step s351, the system determines the log probability of deleting phoneme $p_r$ from the second phoneme sequence and adds this to TEMPDELSCORE. The processing then proceeds to step s353 where the system performs the log addition of TEMPDELSCORE with DELSCORE and stores the result in DELSCORE. The phoneme loop pointer r is then incremented by one in step s355 and the processing returns to step s345. Once the processing steps s347 to s353 have been performed for all the phonemes known to the system, the processing ends.

If at step s341, the system determines that second phoneme sequence loop pointer j2 is not equal to loop pointer j, then the processing proceeds to step s357 where the phoneme loop pointer r is initialised to one. The processing then proceeds to step s359 where the system compares the phoneme counter r with the number of phonemes known to the system (Nphonemes). Initially r is set to one in step s357, and therefore, the processing proceeds to step s361 where the system determines the log probability of phoneme $p_r$ occurring and copies this to the temporary score TEMPDELSCORE. If the loop pointer j2 is not equal to loop pointer j, then the system is propagating the path ending at point (i,j) to one of the points (i+1,j+1), (i+1,j+2) and (i+2,j+1). Therefore, there are no deletions, only insertions and decodings. The processing therefore proceeds to step s363 where the log probability of decoding phoneme $p_r$ as first sequence phoneme $d^1_{i2}$ is added to TEMPDELSCORE. The processing then proceeds to step s365 where the log probability of decoding phoneme $p_r$ as second sequence phoneme $d^2_{j2}$ is determined and added to TEMPDELSCORE. The system then performs, in step s367, the log addition of TEMPDELSCORE with DELSCORE and stores the result in DELSCORE. The phoneme counter r is then incremented by one in step s369 and the processing returns to step s359. Once processing steps s361 to s367 have been performed for all the phonemes known to the system, the processing ends.

Backtracking and Phoneme Sequence Generation

As mentioned above, after the dynamic programming paths have been propagated to the null end node $\emptyset_e$, the path having the best cumulative score is identified and the dynamic programming alignment unit 43 backtracks through the back pointers which were stored in step s233 for the best path, in order to identify the best alignment between the two input sequences of phonemes. In this embodiment, the phoneme sequence determination unit 45 then determines, for each aligned pair of phonemes ($d^1_m$, $d^2_n$) of the best alignment, the unknown phoneme, p, which maximises:

$$P(d_m^1|p)P(d_n^2|p)P(p) \qquad (3)$$

using the decoding probabilities discussed above which are stored in memory 81. This phoneme, p, is the phoneme which is taken to best represent the aligned pair of phonemes. By identifying phoneme, p, for each aligned pair, the determination unit 45 identifies the sequence of canonical phonemes that best represents the two input phoneme sequences. In this embodiment, this canonical sequence is then output by the determination unit 45 and stored in the word to phoneme dictionary 23 together with the text of the new word typed in by the user.

SECOND EMBODIMENT

A description has been given above of the way in which the dynamic programming alignment unit 43 aligns two sequences of phonemes and the way in which the phoneme sequence determination unit 45 obtains the sequence of phonemes which best represents the two input sequences given this best alignment. As those skilled in the art will appreciate, when training a new word, the user may input more than two renditions. Therefore, the dynamic programming alignment unit 43 should preferably be able to align any number of input phoneme sequences and the determination unit 45 should be able to derive the phoneme sequence which best represents any number of input phoneme sequences given the best alignment between them. A description will now be given of the way in which the dynamic programming alignment unit 43 aligns three input phoneme sequences together and how the determination unit 45 determines the phoneme sequence which best represents the three input phoneme sequences.

FIG. 13 shows a three-dimensional coordinate plot with one dimension being provided for each of the three phoneme sequences and illustrates the three-dimensional lattice of points which are processed by the dynamic programming alignment unit 43 in this case. The alignment unit 43 uses the same transition scores and phoneme probabilities and similar dynamic programming constraints in order to propagate and score each of the paths through the three-dimensional network of lattice points in the plot shown in FIG. 13.

A detailed description will now be given with reference to FIGS. 14 to 17 of the three-dimensional dynamic programming alignment carried out by the alignment unit 43 in this case. As those skilled in the art will appreciate from a comparison of FIGS. 14 to 17 with FIGS. 9 to 12, the three-dimensional dynamic programming process that is performed is essentially the same as the two-dimensional dynamic programming process performed when there were only two input phoneme sequences, except with the addition of a few further control loops, in order to take into account the extra phoneme sequence.

As in the first case, the scores associated with all the nodes are initialised and then the dynamic programming alignment unit 43 propagates dynamic programming paths from the null start node $\emptyset_e$ to each of the start points defined by the dynamic programming constraints. It then propagates these paths from these start points to the null end node $\emptyset_e$ by processing the points in the search space in a raster-like fashion. The control algorithm used to control this raster processing operation is shown in FIG. 14. As can be seen from a comparison of FIG. 14 with FIG. 9, this control algorithm has the same general form as the control algorithm used when there were only two phoneme sequences to be aligned. The only differences are in the more complex propagation step s419 and in the provision of query block s421, block s423 and block s425 which are needed in order to process the additional lattice points caused by the third phoneme sequence. For a better understanding of how the control algorithm illustrated in FIG. 17 operates, the reader is referred to the description given above of FIG. 12.

FIG. 15 is a flowchart which illustrates the processing steps involved in the propagation step s419 shown in FIG. 10. FIG. 10 shows the corresponding flowchart for the two-dimensional case described above. As can be seen from a comparison of FIG. 15 with FIG. 10, the main differences between the two flowcharts are the additional variables (mxk and k2) and processing blocks (s451, s453, s455 and s457) which are required to process the additional lattice points due to the third phoneme sequence. For a better understanding of the processing steps involved in the flowchart shown in FIG. 15, the reader is referred to the description of FIG. 10.

FIG. 16 is a flowchart illustrating the processing steps involved in calculating the transition score when a dynamic programming path is propagated from point (i,j,k) to point (i2, j2, k2) during the processing steps in FIG. 15. FIG. 11 shows the corresponding flowchart for the two-dimensional case described above. As can be seen from comparing FIG. 16 to FIG. 11, the main difference between the two flowcharts is the additional process step s461 for calculating the insertion probabilities for inserted phonemes in the third phoneme sequence. Therefore, for a better understanding of the processing steps involved in the flowchart shown in FIG. 16, the reader is referred to the description of FIG. 11.

The processing steps involved in step s463 in FIG. 16 to determine the deletion and/or decoding scores in propagating from point (i,j,k) to point (i2,j2,k2) will now be described in more detail with reference to FIG. 17. Initially, the system determines (in steps s525 to s537) if there are any phoneme deletions from any of the three phoneme sequences by comparing i2, j2 and k2 with i, j and k respectively. As shown in FIGS. 17a to 17d, there are eight main branches which operate to determine the appropriate decoding and deletion probabilities for the eight possible situations. Since the processing performed in each situation is very similar, a description will only be given of one of the situations.

In particular, if at steps s525, s527 and s531, the system determines that there has been a deletion from the first phoneme sequence (because i2=i) and that there are no deletions from the other two phoneme sequences (because j2≠j and k2≠k), then the processing proceeds to step s541 where a phoneme loop pointer r is initialised to one. The phoneme loop pointer r is used to loop through each possible phoneme known to the system during the calculation of an equation similar to equation (1) described above. The processing then proceeds to step s543 where the system compares the phoneme pointer r with the number of phonemes known to the system, Nphonemes (which in this embodiment equals 43). Initially, r is set to one in step s541. Therefore the processing proceeds to step s545 where the system determines the log probability of phoneme $p_r$ occurring and copies this to a temporary score TEMPDELSCORE. The processing then proceeds to step s547 where the system determines the log probability of deleting phoneme $p_r$ in the first phoneme sequence and adds this to TEMPDELSCORE. The processing then proceeds to step s549 where the system determines the log probability of decoding phoneme $p_r$ as second sequence phoneme $d^2_{j2}$ and adds this to TEMPDELSCORE. The processing then proceeds to step s551 where the system determines the log probability of decoding phoneme $p_r$ as third sequence phoneme $d^3_{k2}$ and adds this to TEMPDELSCORE. The processing then proceeds to step s553 where the system performs the log addition of TEMPDELSCORE with DELSCORE and stores the result in DELSCORE. The processing then proceeds to step s555 where the phoneme pointer r is incremented by one. The processing then returns to step s543 where a similar processing is performed for the next phoneme known to the system. Once this calculation has been performed for each of the 43 phonemes known to the system, the processing ends.

As can be seen from a comparison of the processing steps performed in FIG. 17 and the steps performed in FIG. 12, the term calculated within the dynamic programming algorithm for decodings and deletions is similar to equation (1) but has an additional probability term for the third phoneme sequence. In particular, it has the following form:

$$\sum_{r=1}^{N_p} P(d_i^1 \mid p_r) P(d_j^2 \mid p_r) P(d_k^3 \mid p_r) P(p_r) \quad (4)$$

As with the two dimensional case, after the dynamic programming paths have been propagated through to the null end node $\emptyset_e$, the dynamic programming alignment unit 78 identifies the path having the best score and uses the back pointers which have been stored for this path to identify the aligned phoneme triples (i.e. the aligned phonemes in the three sequences) which lie along this best path. In this embodiment, for each of these aligned phoneme triples ($d^1_m$, $d^2_n$, $d^3_o$) the phoneme sequence determination unit 79 determines the phoneme, p, which maximises:

$$P(d_m^1 \mid p) P(d_n^2 \mid p) P(d_o^3 \mid p) P(p) \quad (5)$$

in order to generate the canonical sequence of phonemes which best represents the three input phoneme sequences.

A description has been given above of the way in which the dynamic programming alignment unit 43 aligns two or three sequences of phonemes. As has been demonstrated for the three phoneme sequence case, the addition of a further phoneme sequence simply involves the addition of a number of loops in the control algorithm in order to account for the additional phoneme sequence. As those skilled in the art will appreciate, the alignment unit 43 can therefore identify the best alignment between any number of input phoneme sequences by identifying how many sequences are input and then ensuring that appropriate control variables are provided for each input sequence. The determination unit 45 can then identify the sequence of phonemes which best represents the input phoneme sequences using these alignment results.

THIRD EMBODIMENT

A system was described above which allows a user to add word models to a word to phoneme dictionary used in a speech recognition system. The new word as typed in is stored in the dictionary together with the sequence or phonemes which matches best with the spoken renditions of the new word. As those skilled in the art will appreciate, many words have different pronunciations. In this case, the user may input the different pronunciations as different word models. Alternatively, a lattice of the phoneme sequences representative of the different pronunciations could be generated and stored for the single word. A third embodiment will now be described which illustrates the way in which phoneme sequences representative of different pronunciations of a new word may be generated and how such a lattice of phoneme sequences may be created. In this third embodiment, the method of word training described earlier is used to initially create a single postulated phoneme sequence for a word taken from a large number of example phonetic decodings of the word. This postulated version is then used to score all the decodings of the word according to their similarity to the postulated form. Versions with similar scores are then clustered. If more than one cluster emerges then a postulated representation for each cluster is determined and the original decodings are re-scored and re-clustered relative to the new postulated representations. This process is then iterated until some convergence criteria is achieved. This process will now be explained in more detail with reference to FIGS. 18 to 20.

FIG. 18 shows in more detail the main components of the word model generation unit 31 of the third embodiment. As shown, the word generation unit 31 is similar to the word generation unit of the first embodiment. In particular, it includes a memory 41 which receives each phoneme sequence ($D^i$) output from the speech recognition engine 17 for each of the renditions of the new word input by the user. After the user has finished inputting the training examples, the phoneme sequences stored in the memory 41 are applied to the dynamic programming alignment unit 43 which determines the best alignment between the phoneme sequences in the manner described above.

The phoneme sequence determination unit 45 then determines (also in the manner described above) the sequence of phonemes which matches best with the input phoneme sequences. This best phoneme sequence ($D^{best}$) and the original input phoneme sequences ($D^i$) are then passed to an analysis unit 61 which compares the best phoneme sequence with each of the input sequences to determine how well each of the input sequences corresponds to the best sequence. If the input sequence is the same length as the best sequence, then the analysis unit does this, in this embodiment, by calculating:

$$P(D^i \mid D^{best}) = \prod_{j=1}^{N_i} P(d_j^i \mid d_j^{best}) \qquad (6)$$

where $d^i_j$ and $d^{best}_j$ are the corresponding phonemes from the current input sequence and the representative sequence respectively. If, on the other hand, the input sequence is not the same length as the best sequence, then, in this embodiment, the analysis unit compares the two sequences using a dynamic programming technique such as the one described above.

The analysis unit 61 then analyses each of these probabilities using a clustering algorithm to identify if different clusters can be found within these probability scores— which would indicate that the input sequences include different pronunciations for the input word. This is schematically illustrated in the plot shown in FIG. 19. In particular, FIG. 19 has the probability scores determined in the above manner plotted on the x-axis with the number of training sequences having that score plotted on the y-axis. (As those skilled in the art will appreciate, in practice the plot will be a histogram, since it is unlikely that many scores will be exactly the same). The two peaks 71 and 73 in this plot indicate that there are two different pronunciations of the training word. Once the analysis unit 61 has performed the clustering algorithm, it assigns each of the input phoneme sequences ($D^i$) to one of the different clusters. The analysis unit 61 then outputs the input phoneme sequences of each cluster back to the dynamic programming alignment unit 43 which processes the input phoneme sequences in each cluster separately so that the phoneme sequence determination unit 45 can determine a representative phoneme sequence for each of the clusters. In this embodiment, when the alignment unit 43 processes the phoneme sequences of one cluster, the phoneme sequences of the or each other cluster are stored in the memory 47. Once a representative sequence for each cluster has been determined, the analysis unit 61 then compares each of the input phoneme sequences with all of the cluster representative sequences and then re-clusters the input phoneme sequences. This whole process is then iterated until a suitable convergence criteria is achieved.

The representative sequence for each cluster identified using this process may then be stored in the word to phoneme dictionary 23 together with the typed version of the word. However, as shown in FIG. 18, in this embodiment, the cluster representations are input to a phoneme sequence combination unit 63 which combines the representative phoneme sequences to generate a phoneme lattice using a standard forward/backward truncation technique. This is illustrated in FIGS. 20 and 21. In particular, FIG. 20 shows two sequences of phonemes 75 and 77 represented by sequences A-B-C-D and A-E-C-D and FIG. 21 shows the resulting phoneme lattice 79 obtained by combining the two sequences shown in FIG. 20 using the forward/backward truncation technique. The phoneme lattice 79 output by the phoneme combination unit 63 is then stored in the word to phoneme dictionary 23 together with the typed version of the word.

As those skilled in the art will appreciate, storing the different pronunciations in a lattice in this way, reduces the amount of storage space required for the phoneme sequences in the word to phoneme dictionary 23.

Training

In the above embodiments, the dynamic programming alignment unit 78 used 1892 decoding/deletion probabilities and 43 insertion probabilities to score the dynamic programming paths in the phoneme alignment operation. In this embodiment, these probabilities are determined in advance during a training session and are stored in the memory 47. In particular, during this training session, a speech recognition system is used to provide a phoneme decoding of speech in two ways. In the first way, the speech recognition system is provided with both the speech and the actual words which are spoken. The speech recognition system can therefore use this information to generate the canonical phoneme sequence of the spoken words to obtain an ideal decoding of the speech. The speech recognition system is then used to decode the same speech, but this time without knowledge of the actual words spoken (referred to hereinafter as the free decoding). The phoneme sequence generated from the free decoding will differ from the canonical phoneme sequence in the following ways:

i) the free decoding may make mistakes and insert phonemes into the decoding which are not present in the canonical sequence or, alternatively, omit phonemes in the decoding which are present in the canonical sequence;

ii) one phoneme may be confused with another; and iii) even if the speech recognition system decodes the speech perfectly, the free decoding may nonetheless differ from the canonical decoding due to the differences between conversational pronunciation and canonical pronunciation, e.g., in conversational speech the word "and" (whose canonical forms are /ae/ /n/ /d/ and /ax/ /n/ /d/) is frequently reduced to /ax/ /n/ or even /n/.

Therefore, if a large number of utterances are decoded into their canonical forms and their free decoded forms, then a dynamic programming method (similar to the one described above) can be used to align the two. This provides counts of what was decoded, d, when the phoneme should, canonically, have been a p. From these training results, the above decoding, deletion and insertion probabilities can be approximated in the following way.

The probability that phoneme, d, is an insertion is given by:

$$PI(d) = \frac{I_d}{n_o^d} \qquad (6)$$

where $I_d$ is the number of times the automatic speech recognition system inserted phoneme d and $n_o^d$ is the total number of decoded phonemes which are inserted relative to the canonical sequence.

The probability of decoding phoneme p as phoneme d is given by:

$$P(d \mid p) = \frac{c_{dp}}{n_p} \qquad (7)$$

where $C_{dp}$ is the number of times the automatic speech recognition system decoded d when it should have been p and $n_p$ is the number of times the automatic speech recognition system decoded anything (including a deletion) when it should have been p.

The probability of not decoding anything (i.e. there being a deletion) when the phoneme p should have been decoded is given by:

$$P(\emptyset \mid p) = \frac{O_p}{n_p} \qquad (8)$$

where $O_p$ is the number of times the automatic speech recognition system decoded nothing when it should have decoded p and $n_p$ is the same as above.

ALTERNATIVE EMBODIMENTS

As those skilled in the art will appreciate, whilst the term "phoneme" has been used throughout the above description, the present application is not limited to its linguistic meaning, but includes the different sub-word units that are normally identified and used in standard speech recognition systems. In particular, the term "phoneme" covers any such sub-word unit, such as phones, syllables or katakana (Japanese alphabet).

As those skilled in the art will appreciate, the above description of the dynamic programming alignment of the sequences of phonemes was given by way of example only and various modifications can be made. For example, whilst a raster scanning technique for propagating the paths through the lattice points was employed, other techniques could be employed which progressively propagate the paths through the lattice points. Additionally, as those skilled in the art will appreciate, dynamic programming constraints other than those described above may be used to control the matching process.

In the above embodiment, the dynamic programming alignment unit calculated decoding scores for each transition using equation (1) above. Instead of summing over all possible phonemes known to the system in accordance with equation (1), the dynamic programming alignment unit may be arranged, instead, to identify the unknown phoneme, p, which maximises the probability term within the summation and to use this maximum probability term as the probability of decoding the corresponding phonemes in the input sequences. In such an embodiment, the dynamic programming alignment unit would also preferably store an indication of the phoneme which maximised this probability with the appropriate back pointer, so that after the best alignment between the input phoneme sequences has been determined, the sequence of phonemes which best represents the input sequences can simply be determined by the phoneme sequence determination unit from this stored data.

In the above embodiment, the insertion, deletion and decoding probabilities were calculated from statistics of the speech recognition system using a maximum likelihood estimate of the probabilities. As those skilled in the art of statistics will appreciate, other techniques, such as maximum entropy techniques, can be used to estimate these probabilities. Details of a suitable maximum entropy technique can be found at pages 45 to 52 in the book entitled "Maximum Entropy and Bayesian Methods" published by Kluwer Academic publishers and written by John Skilling, the contents of which are incorporated herein by reference.

In the above embodiments, a dynamic programming algorithm was used to align the sequences of phonemes output by the speech recognition engine. As those skilled in the art will appreciate, any alignment technique could be used. For example, a naive technique could be used which considers all possible alignments. However, dynamic programming is preferred because of its ease of implementation using standard processing hardware. Additionally, whilst in the above embodiment, the dynamic programming alignment unit determined the "best" alignment between the input sequences of phonemes, this may not, in some applications, be strictly necessary. For example, the second, third or fourth best alignment may be used instead.

In the above embodiments, the dynamic programming alignment unit was operable to simultaneously align a plurality of input sequences of phonemes in order to identify the best alignment between them. In an alternative embodiment, the dynamic programming alignment unit may be arranged to compare two sequences of input phonemes at a time. In this case, for example, the third input phoneme sequence would be aligned with the sequence of phonemes which best represents the first two sequences of phonemes etc.

In the embodiment described above, during the dynamic programming algorithm, equation (1) was calculated for each aligned pair of phonemes. In the calculation of equation (1), the first sequence phoneme and the second sequence phoneme were compared with each of the phonemes known to the system. As those skilled in the art will appreciate, for a given first sequence phoneme and second sequence phoneme pair, many of the probabilities given in equation (1) will be equal to or very close to zero. Therefore, in an alternative embodiment the aligned phonemes may only be compared with a subset of all the known phonemes, which subset is determined in advance from the training data. To implement such an embodiment, the input phonemes to be aligned could be used to address a lookup table which would identify the phonemes which need to be compared with them using equation (1) (or its multi-input sequence equivalent).

In the above embodiment, the user input a number of spoken renditions of the new input word together with a typed rendition of the new word. In an alternative embodiment, rather than typing in a rendition of the new word, it may be input as a handwritten version which is subsequently converted into text using appropriate handwriting recognition software.

In the above embodiments, new word models were generated for use in a speech recognition system. In particular, in the examples given above, the new word models are stored together with a text version of the word so that the text can be used in a word processing application. However, as mentioned in the introduction, the word models may be used as a control command rather than being for use in generating corresponding text. In this case, rather than storing text corresponding to the new word model, the corresponding control action or command would be input and stored.

A number of embodiments and modifications have been described above. As those skilled in the art will appreciate, there are many other embodiments and modifications which will be apparent to those skilled in the art.

The invention claimed is:

1. An apparatus for generating a sequence of sub-word units representative of a new word to be added to a dictionary of a speech recognition system, the apparatus comprising:
receiving means for receiving signals representative of first and second spoken renditions of the new word;
speech recognition means for comparing the received first and second spoken renditions with pre-stored sub-word unit models to generate first and second sequences of sub-word units representative of said first and second spoken renditions of the new word respectively;
means for aligning sub-word units of the first sequence with sub-word units of the second sequence to form a number of aligned pairs of sub-word units;
first comparing means for comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;
second comparing means for comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set; and
means for determining, for each aligned pair of sub-word units, a sub-word unit representative of the sub-word units in the aligned pair in dependence upon the comparison scores generated by said first and second comparing means for the aligned pair, to determine a sequence of sub-word units representative of the spoken renditions of the new word.

2. An apparatus according to claim 1, wherein said determining means is operable to determine said sequence of sub-word units by determining, for each aligned pair of sub-word units, a sub-word unit that is confusingly similar to the first and second sub-word units of the aligned pair.

3. An apparatus according to claim 1, further comprising:
means for combining the comparison scores obtained when comparing the first and second sequence sub-word units in the aligned pair with the same sub-word unit from the set, to generate a plurality of combined comparison scores; and
third comparing means for comparing, for each aligned pair, the combined comparison scores generated by said combining means for the aligned pair,
wherein said determining means is operable to determine, for each aligned pair of sub-word units, a sub-word unit representative of the sub-word units in the aligned pair in dependence upon a comparison result output by said third comparing means for the aligned pair.

4. An apparatus according to claim 3, wherein said first and second comparing means are operable to generate comparison scores which are indicative of a probability of confusing the corresponding sub-word unit taken from the set of predetermined sub-word units as the sub-word unit in the aligned pair.

5. An apparatus according to claim 4, wherein said combining means is operable to combine the comparison scores in order to multiply the probabilities of confusing the corresponding sub-word unit taken from the set as the sub-word units in the aligned pair.

6. An apparatus according to claim 5, wherein each of said sub-word units in said set of predetermined sub-word units has a predetermined probability of occurring within a sequence of sub-word units and wherein said combining means is operable to weight each of said combined comparison scores in dependence upon the respective probability of occurrence for the sub-word unit of the set used to generate the combined comparison score.

7. An apparatus according to claim 6, wherein said combining means is operable to combine said comparison scores by calculating:

$$P(d^1_i|p_r)P(d^2_j|p_r)P(p_r)$$

where $d^1_i$ and $d^2_j$ are an aligned pair of first and second sequence sub-word units respectively; $P(d^1_i|p_r)$ is the comparison score generated by said first comparing means and is representative of the probability of confusing set sub-word unit $p_r$ as first sequence sub-word unit $d^2_i$; $P(d^2_j|p_r)$ is the comparison score generated by said second comparing means and is representative of the probability of confusing set sub-word unit Pr as second sequence sub-word unit $d^2_j$; and $P(p_r)$ is a weight which represents the probability of set sub-word unit $p_r$ occurring in a sequence of sub-word units.

8. An apparatus according to claim 7, wherein said third comparing means is operable to identify the set sub-word unit which gives the maximum combined comparison score and wherein said determining means is operable to determine said sub-word unit representative of the sub-word units in the aligned pair as being the sub-word unit which provides the maximum combined comparison score.

9. An apparatus according to claim 5, wherein said comparison scores represent log probabilities and wherein said combining means is operable to multiply said probabilities by adding the respective comparison scores.

10. An apparatus according to claim 3, wherein each of the sub-word units in said first and second sequences of sub-word units belong to said set of predetermined sub-word units and wherein said first and second comparing means are operable to generate said comparison scores using predetermined data which relate the sub-word units in said set to each other.

11. An apparatus according to claim 10, wherein said predetermined data comprises, for each sub-word unit in the set of sub-word units, a probability for confusing that sub-word unit with each of the other sub-word units in the set of sub-word units.

12. An apparatus according to claim 1, wherein said first and second comparing means are operable to compare the first sequence sub-word unit and the second sequence sub-word unit respectively with each of the sub-word units in said set of sub-word units.

13. An apparatus according to claim 1, wherein said aligning means comprises dynamic programming means for aligning said first and second sequences of sub-word units using a dynamic programming technique.

14. An apparatus according to claim 13, wherein said dynamic programming means is operable to determine an optimum alignment between said first and second sequences of sub-word units.

15. An apparatus according to claim 1, wherein each of said sub-word units represents a phoneme.

16. An apparatus according to claim 1, wherein said receiving means is operable to receive signals representative of a third spoken rendition of the new word, wherein said recognition means is operable to compare the third rendition of the new word with said pre-stored sub-word unit models to generate a third sequence of sub-word units representative of said third rendition of the new word, wherein said aligning means is operable to align simultaneously the sub-word units of the first, second and third sequences of sub-word units to generate a number of aligned groups of sub-word units, each aligned group comprising a sub-word unit from each of the renditions, and wherein said determining means is operable to determine said representative sequence of sub-word units in dependence upon the aligned groups of sub-word units.

17. An apparatus according to claim 1, wherein said receiving means is operable to receive signals representative of a third spoken rendition of the new word, wherein said recognition means is operable to compare the third rendition of the new word with said pre-stored sub-word unit models to generate a third sequence of sub-word units representative of said third rendition of the new word and wherein said aligning means is operable to align two sequences of sub-word units at a time.

18. An apparatus according to claim 1, wherein said receiving means is operable to receive signals representative of a plurality of spoken renditions of the new word, wherein said speech recognition means is operable to compare the received spoken renditions with pre-stored sub-word unit models to generate a sequence of sub-word units for each of the plurality of spoken renditions, wherein said aligning means is operable to align the sub-word units of the plurality of sequences of sub-word units to form a number of aligned groups of sub-word units, each group including a sub-word unit from each sequence; wherein said determining means is operable to determine a sequence of sub-word units representative of the spoken renditions of the new word; wherein the apparatus further comprises (i) means for comparing each sequence of sub-word units with said representative sequence of sub-word units to determine a score representative of the similarity therebetween; and (ii) means for processing the scores output by the comparing means to identify clusters within the scores indicating one or more different pronunciations of the spoken rendition of the new word; and wherein said determining means is operable to determine a sequence of sub-word units representative of the spoken renditions of the new word within each cluster.

19. An apparatus according to claim 18, wherein said comparing means, processing means and determining means operable iteratively until a predetermined convergence criterion is met.

20. An apparatus according to claim 18, further comprising means for combining the sequences of sub-word units for each of the clusters into a sub-word unit lattice.

21. An apparatus according to claim 1, wherein said generated sequence of sub-word units is representative of a new command to be added to a command dictionary of said speech recognition system.

22. An apparatus according to claim 1, wherein said generated sequence of sub-word units is representative of a new word to be added to a word dictionary of a speech recognition system together with a text rendition of the new word.

23. An apparatus according to claim 1, wherein said generated sequence of sub-word units is representative of a new word to be added to a word dictionary of a speech recognition system together with a text rendition of the new word.

24. An apparatus for adding a new word and sub-word representation of the new word to a word dictionary of a speech recognition system, the apparatus comprising:

means for receiving a first sequence of sub-word units representative of a first spoken rendition of the new word and for receiving a second sequence of sub-word units representative of a second spoken rendition of the new word;
means for aligning sub-word units of the first sequence with sub-word units of the second sequence to form a number of aligned pairs of sub-word units;
first comparing means for comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;
second comparing means for comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;
means for determining, for each aligned pair of sub-word units, a sub-word unit representative of the sub-word units in the aligned pair in dependence upon the comparison scores generated by said first and second comparing means for the aligned pair, to determine a sequence of sub-word units representative of the spoken renditions of the new word; and
means for adding the new word and the representative sequence of sub-word units to said word dictionary.

25. A speech recognition system comprising:
means for receiving speech signals to be recognised;
means for storing sub-word unit models;
means for matching received speech with the sub-word unit models to generate one or more sequences of sub-word units representative of the received speech signals;
a word dictionary relating sequences of sub-word units to words;
a word decoder for processing the one or more sequences of sub-word units output by said matching means using the word dictionary to generate one or more words corresponding to the received speech signals;
an apparatus for adding a new word and a sub-word representation of the new word to the word dictionary; and
mean for controllably connecting the output of said matching means to either said word decoder or said apparatus for adding the new word and a sub-word representation of the new word to the word dictionary;
characterised in that said apparatus for adding the new word and a sub-word representation of the new word to the word dictionary comprises:
means for receiving a first sequence of sub-word units representative of a first spoken rendition of the new word output by said comparing means and for receiving a second sequence of sub-word units representative of a second spoken rendition of the new word output by said comparing means;
means for aligning sub-word units of the first sequence with sub-word units of the second sequence to form a number of aligned pairs of sub-word units;
first comparing means for comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

second comparing means for comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;

means for determining, for each aligned pair of sub-word units, a sub-word unit representative of the sub-word units in the aligned pair in dependence upon the comparison scores generated by said first and second comparing means for the aligned pair, to determine a sequence of sub-word units representative of the spoken renditions of the new word;

means for receiving a text rendition of the new word; and means for adding said text rendition of the new word and the representative sequence of sub-word units to said word dictionary.

26. A method of generating a sequence of sub-word units representative of a new word to be added to a dictionary of a speech recognition system, the method comprising:

receiving signals representative of first and second spoken renditions of the new word;

comparing the received first and second spoken renditions with pre-stored sub-word unit models to generate a first sequence of sub-word units representative of said first spoken rendition of the new word and a second sequence of sub-word units representative of said second spoken rendition of the new word;

aligning sub-word units of the first sequence with sub-word units of the second sequence to form a number of aligned pairs of sub-word units;

a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set; and determining, for each aligned pair of sub-word units, a sub-word unit representative of the sub-word units in the aligned pair in dependence upon the comparison scores generated by said first and second comparing steps for the aligned pair, to determine a sequence of sub-word units representative of the spoken renditions of the new word.

27. A method according to claim 26, wherein said determining step determines said sequence of sub-word units by determining, for each aligned pair of sub-word units, a sub-word unit that is confusingly similar to the first and second sub-word units of the aligned pair.

28. A method according to claim 26, further comprising:

combining the comparison scores obtained when comparing the first and second sequence sub-word units in the aligned pair with the same sub-word unit from the set, to generate a plurality of combined comparison scores; and a third comparing step of comparing, for each aligned pair, the combined comparison scores generated by said combining step for the aligned pair;

wherein said determining step determines, for each aligned pair of sub-word units, a sub-word unit representative of the sub-word units in the aligned pair in dependence upon a comparison result output by said third comparing step for the aligned pair.

29. A method according to claim 28, wherein said first and second comparing steps generate comparison scores which are indicative of a probability of confusing the corresponding sub-word unit taken from the set of predetermined sub-word units as the sub-word unit in the aligned pair.

30. A method according to claim 29, wherein said combining step combines the comparison scores in order to multiply the probabilities of confusing the corresponding sub-word unit taken from the set as the sub-word units in the aligned pair.

31. A method according to claim 30, wherein each of said sub-word units in said set of predetermined sub-word units has a predetermined probability of occurring within a sequence of sub-word units and wherein said combining step weights each of said combined comparison scores in dependence upon the respective probability of occurrence for the sub-word unit of the set used to generate the combined comparison score.

32. A method according to claim 31, wherein said combining step combines said comparison scores by calculating:

$$P(d^1{}_i|p_r)P(d^2{}_j|p_r)P(p_r)$$

where $d^1{}_i$ and $d^2{}_j$ are an aligned pair of first and second sequence sub-word units respectively; $P(d^1{}_i|p_r)$ is the comparison score generated by said first comparing step and is representative of the probability of confusing set sub-word unit $p_r$ as first sequence sub-word unit $d^1{}_i$; $P(d^2{}_j|p_r)$ is the comparison score generated by said second comparing step and is representative of the probability of confusing set sub-word unit $p_r$ as second sequence sub-word unit $d^2{}_j$; and $P(p_r)$ is a weight which represents the probability of set sub-word unit $p_r$ occurring in a sequence of sub-word units.

33. A method according to claim 32, wherein said third comparing step identifies the set sub-word unit which gives the maximum combined comparison score and wherein said determining step determines said sub-word unit representative of the sub-word units in the aligned pair as being the sub-word unit which provides the maximum combined comparison score.

34. A method according to claim 30, wherein said comparison scores represent log probabilities and wherein said combining step multiplies said probabilities by adding the respective comparison scores.

35. A method according to claim 28, wherein each of the sub-word units in said first and second sequences of sub-word units belong to said set of predetermined sub-word units and wherein said first and second comparing steps generate said comparison scores using predetermined data which relate the sub-word units in said set to each other.

36. A method according to claim 35, wherein said predetermined data comprises, for each sub-word unit in the set of sub-word units, a probability for confusing that sub-word unit with each of the other sub-word units in the set of sub-word units.

37. A method according to claim 26, wherein said first and second comparing steps compare the first sequence sub-word unit and the second sequence sub-word unit respectively with each of the sub-word units in said set of sub-word units.

38. A method according to claim 26, wherein said aligning step uses a dynamic programming technique to align said first and second sequences of sub-word units.

39. A method according to claim 38, wherein said dynamic programming technique determines an optimum alignment between said first and second sequences of sub-word units.

40. A method according to claim 26, wherein each of said sub-word units represents a phoneme.

41. A method according to claim 26, wherein said receiving step receives signals representative of a third spoken rendition of the new word, wherein said comparing step compares the third rendition of the new word with said pre-stored sub-word unit models to generate a third sequence of sub-word units representative of said third rendition of the new word, wherein said aligning step simultaneously aligns the sub-word units of the first, second and third sequences of sub-word units to generate a number of aligned groups of sub-word units, each aligned group comprising a sub-word unit from each of the renditions, and wherein said determining step determines said representative sequence of sub-word units in dependence upon the aligned groups of sub-word units.

42. A method according to claim 26, wherein said receiving step receives signals representative of a third spoken rendition of the new word, wherein said comparing step compares the third rendition of the new word with said pre-stored sub-word unit models to generate a third sequence of sub-word units representative of said third rendition of the new word and wherein said aligning step aligns two sequences of sub-word units at a time.

43. A method according to claim 26, wherein said receiving step receives signals representative of a plurality of spoken renditions of the new word, wherein said comparing step compares the received spoken renditions with pre-stored sub-word unit models to generate a sequence of sub-word units for each of the plurality of spoken renditions, wherein said aligning step aligns the sub-word units of the plurality of sequences of sub-word units to form a number of aligned groups of sub-word units, each group including a sub-word unit from each sequence; wherein said determining step determines a sequence of sub-word units representative of the spoken renditions of the new word; wherein the method further comprises the steps of: (i) comparing each sequence of sub-word units with said representative sequence of sub-word units to determine a score representative of the similarity therebetween; and (ii) processing the scores output by the comparing step to identify clusters within the scores indicating one or more different pronunciations of the spoken rendition of the new word; and wherein said determining step determines a sequence of sub-word units representative of the spoken renditions of the new word within each cluster.

44. A method according to claim 43, wherein said comparing step, processing step and determining step operate iteratively until a predetermined convergence criterion is met.

45. A method according to claim 43, further comprising means for combining the sequences of sub-word units for each of the clusters into a sub-word unit lattice.

46. A method according to claim 26, wherein said generated sequence of sub-word units are representative of a new word to be added to a word dictionary of a speech recognition system.

47. A method according to claim 26, wherein said generated sequence of sub-word units are representative of a new word to be added to a command dictionary of a speech recognition system.

48. A method of adding a new word and sub-word representation of the new word to a word dictionary of a speech recognition system, the method comprising the steps of:
receiving a first sequence of sub-word units representative of a first spoken rendition of the new word and for receiving a second sequence of sub-word units representative of a second spoken rendition of the new word;
aligning sub-word units of the first sequence with sub-word units of the second sequence to form a number of aligned pairs of sub-word units;
a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;
a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;
determining, for each aligned pair of sub-word units, a sub-word unit representative of the sub-word units in the aligned pair in dependence upon the comparison scores generated by said first and second comparing step for the aligned pair, to determine a sequence of sub-word units representative of the spoken renditions of the new word; and
adding the new word and the representative sequence of sub-word units to said word dictionary.

49. A speech recognition method comprising the steps of:
receiving speech signals to be recognised;
storing sub-word unit models;
matching received speech signals with the sub-word unit models to generate one or more sequences of sub-word units representative of the received speech signals;
storing a word dictionary relating sequences of sub-word units to words;
processing the one or more sequences of sub-word units output by said matching step using the stored word dictionary to generate one or more words corresponding to the received speech signals;
a step of adding a new word and a sub-word representation of the new word to the word dictionary; and
controllably feeding the output of said matching step to either said processing step or said adding step;
characterised in that said adding step comprises:
receiving a first sequence of sub-word units representative of a first spoken rendition of the new word output by said comparing step and for receiving a second sequence of sub-word units representative of a second spoken rendition of the new word output by said comparing step;

aligning sub-word units of the first sequence with sub-word units of the second sequence to form a number of aligned pairs of sub-word units;

a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;

determining, for each aligned pair of sub-word units, a sub-word unit representative of the sub-word units in the aligned pair in dependence upon the comparison scores generated by said first and second comparing steps for the aligned pair, to determine a sequence of sub-word units representative of the spoken renditions of the new word;

receiving a text rendition of the new word; and adding said text rendition of the new word and the representative sequence of sub-word units to said word dictionary.

50. A storage medium storing processor implementable instructions for controlling a processor to carry out a method of generating a sequence of sub-word units representative of a new word to be added to a dictionary of a speech recognition system, the processor instructions comprising:

receiving instructions for receiving signals representative of first and second spoken renditions of the new word;

instructions for comparing the received first and second spoken renditions with pre-stored sub-word unit models to generate a first sequence of sub-word units representative of said first spoken rendition of the new word and a second sequence of sub-word units representative of said second spoken rendition of the new word;

instructions for aligning sub-word units of the first sequence with sub-word units of the second sequence to form a number of aligned pairs of sub-word units;

instructions for a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

instructions for a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set; and instructions for determining, for each aligned pair of sub-word units, a sub-word unit representative of the sub-word units in the aligned pair in dependence upon the comparison scores generated by said first and second comparing steps for the aligned pair, to determine a sequence of sub-word units representative of the spoken renditions of the new word.

51. A storage medium storing processor implementable instructions for controlling a processor to carry out a method of adding a new word and sub-word representation of the new word to a word dictionary of a speech recognition system, the process instructions comprising:

instructions for receiving a first sequence of sub-word units representative of a first spoken rendition of the new word and for receiving a second sequence of sub-word units representative of a second spoken rendition of the new word;

instructions for aligning sub-word units of the first sequence with sub-word units of the second sequence to form a number of aligned pairs of sub-word units;

instructions for a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

instructions for a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;

instructions for determining, for each aligned pair of sub-word units, a sub-word unit representative of the sub-word units in the aligned pair in dependence upon the comparison scores generated by said first and second comparing steps for the aligned pair, to determine a sequence of sub-word units representative of the spoken renditions of the new word; and instructions for adding the new word and the representative sequence of sub-word units to said word dictionary.

52. A storage medium storing processor implementable instructions for controlling a processor to carry out a speech recognition method, the process instructions comprising:

instructions for receiving speech signals to be recognised;

instructions for storing sub-word unit models;

instructions for matching received speech signals with the sub-word unit models to generate one or more sequences of sub-word units representative of the received speech signals;

instructions for storing a word dictionary relating sequences of sub-word units to words;

instructions for processing the one or more sequences of sub-word units output by said matching step using the stored word dictionary to generate one or more words corresponding to the received speech signals;

instructions for adding a new word and a sub-word representation of the new word to the word dictionary; and instructions for controllably feeding the output of said matching step to either said processing step or said adding step;

characterised in that said adding instructions comprise:

instructions for receiving a first sequence of sub-word units representative of a first spoken rendition of the new word output by said comparing step and for receiving a second sequence of sub-word units representative of a second spoken rendition of the new word output by said matching step;

instructions for aligning sub-word units of the first sequence with sub-word units of the second sequence to form a number of aligned pairs of sub-word units;

instructions for a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

instructions for a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;

instructions for determining, for each aligned pair of sub-word units, a sub-word unit representative of the sub-word units in the aligned pair in dependence upon the comparison scores generated by said first and second comparing steps for the aligned pair, to determine a sequence of sub-word units representative of the spoken renditions of the new word;

instructions for receiving a text rendition of the new word; and instructions for adding said text rendition of the new word and the representative sequence of sub-word units to said word dictionary.

53. Processor implementable instructions for controlling a processor to carry out a method of generating a sequence of sub-word units representative of a new word to be added to a dictionary of a speech recognition system, the processor instructions comprising:

instructions for receiving signals representative of first and second spoken renditions of the new word;

instructions for matching the received first and second spoken renditions with pre-stored sub-word unit models to generate a first sequence of sub-word units representative of said first spoken rendition of the new word and a second sequence of sub-word units representative of said second spoken rendition of the new word;

instructions for aligning sub-word units of the first sequence with sub-word units of the second sequence to form a number of aligned pairs of sub-word units;

instructions for a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

instructions for a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set; and instructions for determining, for each aligned pair of sub-word units, a sub-word unit representative of the sub-word units in the aligned pair in dependence upon the comparison scores generated by said first and second comparing steps for the aligned pair, to determine a sequence of sub-word units representative of the spoken renditions of the new word.

54. Processor implementable instructions for controlling a processor to carry out a method of adding a new word and sub-word representation of the new word to a word dictionary of a speech recognition system, the processor instructions composing:

instructions for receiving a first sequence of sub-word units representative of a first spoken rendition of the new word and for receiving a second sequence of sub-word units representative of a second spoken rendition of the new word;

instructions for aligning sub-word units of the first sequence with sub-word units of the second sequence to form a number of aligned pairs of sub-word units;

instructions for a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

instructions for a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;

instructions for determining, for each aligned pair of sub-word units, a sub-word unit representative of the sub-word units in the aligned pair in dependence upon the comparison scores generated by said first and second comparing steps for the aligned pair, to determine a sequence of sub-word units representative of the spoken renditions of the new word; and instructions for adding the new word and the representative sequence of sub-word units to said word dictionary.

55. Processor implementable instructions for controlling a processor to carry out a speech recognition method, the processor instructions comprising:

instructions for receiving speech signals to be recognised;

instructions for storing sub-word unit models;

instructions for matching received speech signals with the sub-word unit models to generate one or more sequences of sub-word units representative of the received speech signals;

instructions for storing a word dictionary relating sequences of sub-word units to words;

instructions for processing the one or more sequences of sub-word units output by said matching step using the stored word dictionary to generate one or more words corresponding to the received speech signals;

instructions for adding a new word and a sub-word representation of the new word to the word dictionary; and instructions for controllably feeding the output of said matching step to either said processing step or said adding step;

characterised in that said adding instructions comprise:

instructions for receiving a first sequence of sub-word units representative of a first spoken rendition of the new word output by said matching step and for receiving a second sequence of sub-word units representative of a second spoken rendition of the new word output by said matching step;

instructions for aligning sub-word units of the first sequence with sub-word units of the second sequence to form a number of aligned pairs of sub-word units;

instructions for a first comparing step of comparing, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

instructions for a second comparing step of comparing, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;

instructions for determining, for each aligned pair of sub-word units, a sub-word unit representative of the sub-word units in the aligned pair in dependence upon the comparison scores generated by said first and second comparing steps for the aligned pair, to determine a sequence of sub-word units representative of the spoken renditions of the new word;

instructions for receiving a text rendition of the new word; and instructions for adding said text rendition of the new word and the representative sequence of sub-word units to said word dictionary.

56. An apparatus for generating a sequence of sub-word units representative of a new word to be added to a dictionary of a speech recognition system, the apparatus comprising:

a receiver operable to receive signals representative of first and second spoken renditions of the new word;

a speech recogniser operable to compare the received first and second spoken renditions with pre-stored sub-word unit models to generate first and second sequence of sub-word units representative of said first and second spoken renditions of the new word respectively;

a sub-word unit aligner operable to align sub-word units of the first sequence with sub-word units of the second sequence to form a number of aligned pairs of sub-word units;

a first comparator operable to compare, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

a second comparator operable to compare, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set; and a determiner operable to determine, for each aligned pair of sub-word units, a sub-word unit representative of the sub-word units in the aligned pair in dependence upon the comparison scores generated by said first and second comparing means for the aligned pair, to determine a sequence of sub-word units representative of the spoken renditions of the new word.

57. An apparatus according to claim 56, wherein said determiner is operable to determine said sequence of sub-word units by determining, for each aligned pair of sub-word units, a sub-word unit that is confusingly similar to the first and second sub-word units of the aligned pair.

58. An apparatus according to claim 56, further comprising:

a combined score generator operable to combine the comparison scores obtained when comparing the first and second sequence sub-word units in the aligned pair with the same sub-word unit from the set, to generate a plurality of combined comparison scores; and a third comparator operable to compare, for each aligned pair, the combined comparison scores generated by said combined score generator for the aligned pair, wherein said determiner is operable to determine, for each aligned pair of sub-word units, a sub-word unit representative of the sub-word units in the aligned pair in dependence upon a comparison result output by said third comparator for the aligned pair.

59. An apparatus according to claim 58, wherein said first and second comparators are operable to generate comparison scores which are indicative of a probability of confusing the corresponding sub-word unit taken from the set of predetermined sub-word units as the sub-word unit in the aligned pair.

60. An apparatus according to claim 59, wherein said combined score generator is operable to combine the comparison scores in order to multiply the probabilities of confusing the corresponding sub-word unit taken from the set as the sub-word units in the aligned pair.

61. An apparatus according to claim 60, wherein each of said sub-word units in said set of predetermined sub-word units has a predetermined probability of occurring within a sequence of sub-word units and wherein said combined score generator is operable to weight each of said combined comparison scores in dependence upon the respective probability of occurrence for the sub-word unit of the set used to generate the combined comparison score.

62. An apparatus according to claim 61, wherein said combined score generator is operable to combine said comparison scores by calculating:

$$P(d^1_i|p_r)P(d^2_j|p_r)P(p_r)$$

where $d^1_i$ and $d^2_j$ are an aligned pair of first and second sequence sub-word units respectively; $P(d^1_i|p_r)$ is the comparison score generated by said first comparator and is representative of the probability of confusing set sub-word unit $p_r$ as first sequence sub-word unit $d^1_i$; $P(d^2_j|p_r)$ is the comparison score generated by said second comparator and is representative of the probability of confusing set sub-word unit $p_r$ as second sequence sub-word unit $d^2_j$; and $P(p_r)$ is a weight which represents the probability of set sub-word unit $p_r$ occurring in a sequence of sub-word units.

63. An apparatus according to claim 62, wherein said third comparator is operable to identify the set sub-word unit which gives the maximum combined comparison score and wherein said determiner is operable to determine said sub-word unit representative of the sub-word units in the aligned pair as being the sub-word unit which provides the maximum combined comparison score.

64. An apparatus according to claim 60, wherein said comparison scores represent log probabilities and wherein said combined score generator is operable to multiply said probabilities by adding the respective comparison scores.

65. An apparatus according to claim 58, wherein each of the sub-word units in said first and second sequences of sub-word units belong to said set of predetermined sub-word units and wherein said first and second comparators are operable to generate said comparison scores using predetermined data which relate the sub-word units in said set to each other.

66. An apparatus according to claim 65, wherein said predetermined data comprises, for each sub-word unit in the set of sub-word units, a probability for confusing that sub-word unit with each of the other sub-word units in the set of sub-word units.

67. An apparatus according to claim 56, wherein said first and second comparators are operable to compare the first sequence sub-word unit and the second sequence sub-word unit respectively with each of the sub-word units in said set of sub-word units.

68. An apparatus according to claim 56, wherein said sub-word unit aligner comprises a dynamic programming unit operable to align said first and second sequences of sub-word units using a dynamic programming technique.

69. An apparatus according to claim 68, wherein said dynamic programming unit is operable to determine an optimum alignment between said first and second sequences of sub-word units.

70. An apparatus according to claim 56, wherein each of said sub-word units represents a phoneme.

71. An apparatus according to claim 56, wherein said receiver is operable to receive signals representative of a third spoken rendition of the new word, wherein said speech recogniser is operable to compare the third rendition of the new word with said pre-stored sub-word unit models to generate a third sequence of sub-word units representative of said third rendition of the new word, wherein said sub-word unit aligner is operable to align simultaneously the sub-word units of the first, second and third sequences of sub-word units to generate a number of aligned groups of sub-word units, each aligned group comprising a sub-word unit from each of the renditions, and wherein said determiner is operable to determine said representative sequence of sub-word units in dependence upon the aligned groups of sub-word units.

72. An apparatus according to claim 56, wherein said receiver is operable to receive signals representative of a third spoken rendition of the new word, wherein said speech recogniser is operable to compare the third rendition of the new word with said pre-stored sub-word unit models to generate a third sequence of sub-word units representative of said third rendition of the new word and wherein said sub-word unit aligner is operable to align two sequences of sub-word units at a time.

73. An apparatus according to claim 56, wherein said receiver is operable to receive signals representative of a plurality of spoken renditions of the new word, wherein said speech recogniser is operable to compare the received spoken renditions with pre-stored sub-word unit models to generate a sequence of sub-word units for each of the plurality of spoken renditions, wherein said sub-word unit aligner is operable to align the sub-word units of the plurality of sequences of sub-word units to form a number of aligned groups of sub-word units, each group including a sub-word unit from each sequence; wherein said determiner is operable to determine a sequence of sub-word units representative of the spoken renditions of the new word; wherein the apparatus further comprises (i) a comparator operable to compare each sequence of sub-word units with said representative sequence of sub-word units to determine a score representative of the similarity therebetween; and (ii) a cluster identifier operable to process the scores output by the comparator to identify clusters within the scores indicating one or more different pronunciations of the spoken rendition of the new word; and wherein said determiner is operable to determine a sequence of sub-word units representative of the spoken renditions of the new word within each cluster.

74. An apparatus according to claim 73, wherein said comparator, cluster identifier and determiner operate iteratively until a predetermined convergence criterion is met.

75. An apparatus according to claim 73, further comprising a sub-word unit combiner operable to combine the sequences of sub-word units for each of the clusters into a sub-word unit lattice.

76. An apparatus according to claim 56, wherein said generated sequence of sub-word units is representative of a new command to be added to a command dictionary of said speech recognition system.

77. An apparatus for adding a new word and sub-word representation of the new word to a word dictionary of a speech recognition system, the apparatus comprising;
a receiver operable to receive a first sequence of sub-word units representative of a first spoken rendition of the new word and to receive a second sequence of sub-word units representative of a second spoken rendition of the new word;
a sub-word unit aligner operable to align sub-word units of the first sequence with sub-word units of the second sequence to form a number of aligned pairs of sub-word units;
a first comparator operable to compare, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;
a second comparator operable to compare, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;
a determiner operable to determine, for each aligned pair of sub-word units, a sub-word unit representative of the sub-word units in the aligned pair in dependence upon the comparison scores generated by said first and second comparators for the aligned pair, to determine a sequence of sub-word units representative of the spoken renditions of the new word; and
an apparatus operable to add the new word and the representative sequence of sub-word units to said word dictionary.

78. A speech recognition system comprising:
a first receiver operable to receive speech signals to be recognised;
a store operable to store sub-word unit models;

a comparator operable to compare received speech with the sub-word unit models to generate one or more sequences of sub-word units representative of the received speech signals;

a word dictionary relating sequences of sub-word units to words;

a word decoder operable to process the one or more sequences of sub-word units output by said comparator using the word dictionary to generate one or more words corresponding to the received speech signals;

a first apparatus operable to add a new word and a sub-word representation of the new word to the word dictionary; and a switch operable to controllably connect the output of said comparator to either said word decoder or said apparatus for adding the new word and a sub-word representation of the new word to the word dictionary;

characterised in that said apparatus for adding the new word and a sub-word representation of the new word to the word dictionary comprises:

a second receiver operable to receive a first sequence of sub-word units representative of a first spoken rendition of the new word output by said comparator and to receive a second sequence of sub-word units representative of a second spoken rendition of the new word output by said comparator;

a sub-word unit aligner operable to align sub-word units of the first sequence with sub-word units of the second sequence to form a number of aligned pairs of sub-word units;

a first comparator operable to compare, for each aligned pair, the first sequence sub-word unit in the aligned pair with each of a plurality of sub-word units taken from a set of predetermined sub-word units, to generate a corresponding plurality of comparison scores representative of the similarities between the first sequence sub-word unit and the respective sub-word units of the set;

a second comparator operable to compare, for each aligned pair, the second sequence sub-word unit in the aligned pair with each of said plurality of sub-word units from the set, to generate a further corresponding plurality of comparison scores representative of the similarities between said second sequence sub-word unit and the respective sub-word units of the set;

a determiner operable to determine, for each aligned pair of sub-word units, a sub-word unit representative of the sub-word units in the aligned pair in dependence upon the comparison scores generated by said first and second comparators for the aligned pair, to determine a sequence of sub-word units representative of the spoken renditions of the new word;

a third receiver operable to receive a text rendition of the new word; and a second apparatus operable to add said text rendition of the new word and the representative sequence of sub-word units to said word dictionary.

* * * * *

UNITED STATES PATENT AND TRADEMARK OFFICE
CERTIFICATE OF CORRECTION

| | |
|---|---|
| PATENT NO. | : 7,337,116 B2 |
| APPLICATION NO. | : 09/985543 |
| DATED | : February 26, 2008 |
| INVENTOR(S) | : Charlesworth et al. |

It is certified that error appears in the above-identified patent and that said Letters Patent is hereby corrected as shown below:

ON THE COVER PAGE
At (56) References Cited, OTHER PUBLICATIONS:

"Bahl et al., "A metod for the construction of acoustic Markov models for words," Oct. 1993, IEEE Transactions on Speech and Audio Processing, vol. 1, Issue 4, pp. 443-452.*" should read --Bahl et al., "A method for the construction of acoustic Markov models for words," Oct. 1993, IEEE Transactions on Speech and Audio Processing, vol. 1, Issue 4, pp. 443-452.*--.

"Haeb-Umbach et al., "Automatic transcription of unknown words in a speech recognition system," May 1995, International Conference on Acoustics, Speech, and Signal Processing, vol. 1, pp. 840-843.*" should read --Hab-Umbach et al., "Automatic transcription of unknown words in a speech recognition system," May 1995, International Conference on Acoustics, Speech, and Signal Processing, vol. 1, pp. 840-843.*--.

"Zobel, et al., "Phonetic String Matching: Lesson from Information Retrieval", Sigir Forum,, Association for Computing Machinery, pp. 166-172 (1996)." should read --Zobel, et al., "Phonetic String Matching: Lesson from Information Retrieval", Sigir Forum, Association for Computing Machinery, pp. 166-172 (1996).--.

"C. Gerber, "A General Approach to Speech Recognition," Proceedings of the Final Workshop on Multimedia Information Retrieval (MIRO '95), Glasgow, Scotland, Sep. 18-20, 1995, pp. 0-12." should read --C. Gerber, "A General Approach to Speech Recognition," Proceedings of the Final Workshop on Multimedia Information Retrieval (MIRO '95), Glasgow, Scotland, Sep. 18-20, 1995, pp. 1-13.--.

IN THE DRAWINGS:
Figure 16, s293, line 1, "first" should be deleted.

COLUMN 1:
Line 39, "model" should read --models--.

COLUMN 3:
Line 61, "systems 14" should read --system's 14--.

COLUMN 6:
Line 2, "unit 78" should read --unit 43--.

UNITED STATES PATENT AND TRADEMARK OFFICE
CERTIFICATE OF CORRECTION

PATENT NO. : 7,337,116 B2
APPLICATION NO. : 09/985543
DATED : February 26, 2008
INVENTOR(S) : Charlesworth et al.

It is certified that error appears in the above-identified patent and that said Letters Patent is hereby corrected as shown below:

COLUMN 7:
Line 19, "unit 78" should read --unit 43--.
Line 24, "unit 79" should read --unit 45--.
Line 45, "unit 78" should read --unit 43--.

COLUMN 9:
Line 8, "(i.e." should read --(i.e.,--.

COLUMN 10:
Line 6, "(i.e." should read --(i.e.,--.
Line 14, "(i.e." should read --(i.e.,--.
Line 17, "(i.e." should read --(i.e.,--.

COLUMN 11:
Line 45, "memory 81." should read --memory 47.--.

COLUMN 14:
Line 1, "78 identifies" should read --43 identifies--.
Line 3, "(i.e." should read --(i.e.,--.
Line 6, "unit 79" should read --unit 45--.
Line 32, "or" should read --of--.

COLUMN 16:
Line 15, "unit 78" should read --unit 43--.

COLUMN 17:
Line 12, "(i.e." should read --(i.e.,--.

COLUMN 18:
Line 28, "phonemes" should read --phonemes,--.

COLUMN 20:
Line 18, "unit $d^2i$;" should read --unit $d^1i$;--.
Line 20, "unit Pr" should read --unit $p_r$--.

COLUMN 22:
Line 49, "mean" should read --means--.
Line 52, "dictionary;" should read --dictionary,--.

UNITED STATES PATENT AND TRADEMARK OFFICE
CERTIFICATE OF CORRECTION

PATENT NO. : 7,337,116 B2
APPLICATION NO. : 09/985543
DATED : February 26, 2008
INVENTOR(S) : Charlesworth et al.

It is certified that error appears in the above-identified patent and that said Letters Patent is hereby corrected as shown below:

COLUMN 24:
Line 6, "pair;" should read --pair,--.
Line 39, "$d^2i$;" should read --$d^1_i$;--.

COLUMN 25:
Line 45, "of." should read --of--.

COLUMN 26:
Line 60, "step;" should read --step,--.

COLUMN 28:
Line 62, "step;" should read --step,--.

COLUMN 30:
Line 66, "step;" should read --step,--.

COLUMN 31:
Line 46, "sequence" should read --sequences--.

COLUMN 34:
Line 28, "comprising;" should read --comprising:--.

COLUMN 35:
Line 17, "dictionary;" should read --dictionary,--.

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,337,116 B2 | Page 1 of 1 |
| APPLICATION NO. | : 09/985543 | |
| DATED | : February 26, 2008 | |
| INVENTOR(S) | : Charlesworth et al. | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 655 days Delete the phrase "by 655 days" and insert -- by 632 days --

Signed and Sealed this

Fourth Day of May, 2010

David J. Kappos
*Director of the United States Patent and Trademark Office*